(12) United States Patent
Iwasawa et al.

(10) Patent No.: US 8,940,823 B2
(45) Date of Patent: Jan. 27, 2015

(54) WATER-BASED COATING COMPOSITION

(75) Inventors: Akira Iwasawa, Tochigi (JP); Takeshi Fujimoto, Tochigi (JP); Yasuhiro Kawai, Tochigi (JP); Seiji Hamanaka, Tochigi (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 14/000,300

(22) PCT Filed: Mar. 30, 2012

(86) PCT No.: PCT/JP2012/058550
§ 371 (c)(1),
(2), (4) Date: Aug. 19, 2013

(87) PCT Pub. No.: WO2012/133752
PCT Pub. Date: Oct. 4, 2012

(65) Prior Publication Data
US 2014/0011928 A1    Jan. 9, 2014

(30) Foreign Application Priority Data

Mar. 31, 2011 (JP) ................................. 2011-080483

(51) Int. Cl.
*C09D 7/00* (2006.01)
(52) U.S. Cl.
USPC ...................................... 524/249; 106/31.65
(58) Field of Classification Search
CPC ...... C09D 7/005; C09D 7/007; C09D 7/1266; C09D 7/1275
USPC ...................................... 524/249; 106/31.65
See application file for complete search history.

(56) References Cited

U.S. PATENT DOCUMENTS

| 5,552,496 | A | * | 9/1996 | Vogt-Birnbrich et al. ................. 525/440.02 |
| 5,854,337 | A | | 12/1998 | Wandelmaier et al. |
| 6,177,509 | B1 | * | 1/2001 | Irle ............................... 524/591 |
| 7,008,979 | B2 | | 3/2006 | Schottman et al. |
| 2001/0020056 | A1 | * | 9/2001 | Yamanouchi et al. ........ 523/161 |
| 2003/0203991 | A1 | | 10/2003 | Schottman et al. |
| 2005/0124753 | A1 | | 6/2005 | Ashihara et al. |
| 2006/0135651 | A1 | | 6/2006 | Nakane et al. |
| 2010/0028625 | A1 | * | 2/2010 | Kagata et al. .............. 428/195.1 |
| 2011/0077352 | A1 | | 3/2011 | Nakamura et al. |

FOREIGN PATENT DOCUMENTS

| JP | 10-130573 | 5/1998 |
| JP | 10-251573 | 9/1998 |
| JP | 2005-523981 | 8/2005 |
| JP | 2006-176618 | 7/2006 |
| JP | 2007-510017 | 4/2007 |
| JP | 2008-067645 | 3/2008 |
| WO | WO 03/091330 | 11/2003 |
| WO | WO 2007/107231 | * 9/2007 ........... C09D 133/00 |
| WO | WO 2009/145242 | 12/2009 |

OTHER PUBLICATIONS

International Search Report, PCT/JP2012/058550, Jul. 3, 2012.

* cited by examiner

*Primary Examiner* — John Uselding
(74) *Attorney, Agent, or Firm* — Young & Thompson

(57) ABSTRACT

According to a water-based composition characterized by containing a colorant, water, a wetting agent, an amine compound, a hydroxyl group-containing organic solvent and a urethane resin having a polycarbonate group, there is provided a water-based coating composition being capable of easily controlling the gloss of a coating film applied on an object to be coated, having good storage stability, and being excellent in wetting properties to an object to be coated and continuous discharge stability without causing nozzle clogging.

15 Claims, No Drawings

WATER-BASED COATING COMPOSITION

This application is a national stage entry of PCT/JP2012/058550 filed Mar. 30, 2012, which claims priority to JP 2011-080483 filed Mar. 31, 2011.

TECHNICAL FIELD

This invention relates to a water-based coating composition, and to a water-based coating composition being capable of easily controlling the gloss of a coating film applied on an object to be coated, having good storage stability, and being excellent in wetting properties to an object to be coated and continuous discharge stability.

BACKGROUND ART

Heretofore, in the coating composition consisting of a pigment, a binder resin, a pigment wetting agent, a solvent and water, there are proposed a large number of coating compositions using various solvents.

In the case of making a coated product by an ink jet using a conventional coating composition, unstable injection is caused and a coated product is obtained which is bad in adhesion to an object to be coated. Even if such a coating composition is used to make a coated product, the gloss of a coating film is bad or color development is not necessarily sufficient.

The reduction in gloss is generally caused by making the compatibility of a coating composition worse through selection of pigments, solvents, resins and wetting agents in the coating composition. A method of adding a gloss improver is taken to prevent it (for example, see Patent Document 1).

It is also known that cissing or bleeding is caused by insufficient adjustment of a difference in interfacial tension from an object to be coated. A method of adding a surface conditioner is taken to solve it.

Meanwhile, Patent Document 2 discloses a method of adding a silicone acrylic resin as a method for improving cissing or bleeding, but does not provide a water-based composition.

CONVENTIONAL ART DOCUMENTS LIST

Patent Document

Patent Document 1: PCT National-phase Japanese Publication No. 2007-510017
Patent Document 2: Japanese Patent Application Publication No. H10-251573

SUMMARY OF THE INVENTION

Problems to be Solved by the Invention

It is an object of the invention to solve the above-mentioned problems, and to provide a water-based coating composition being capable of controlling the gloss of a coating film, having good storage stability of the coating composition, being excellent in wetting properties to an object to be coated, without cissing or bleeding, and further being excellent in continuous discharge stability without causing nozzle clogging.

Means of Solving the Problems

According to the invention, there is provided a water-based coating composition characterized by containing a colorant, water, a wetting agent, an amine compound, a hydroxyl group-containing organic solvent and a urethane resin having a polycarbonate group.

Effects of the Invention

According to the invention, there can be provided a water-based coating composition being capable of easily controlling the gloss of a coating film applied on an object to be coated, having good storage stability, and being excellent in wetting properties to an object to be coated and continuous discharge stability without causing nozzle clogging.

MODE FOR CARRYING OUT THE INVENTION

The embodiments of the invention will be described in detail below.

The water-based coating composition according to the invention is characterized by containing a colorant, water, a wetting agent, an amine compound, a hydroxyl group-containing organic solvent and a urethane resin having a polycarbonate group. The invention results in a water-based coating composition having good storage stability, being excellent in wetting properties to an object to be coated, being capable of easily controlling the gloss of a coating film applied on an object to be coated, and being excellent in continuous discharge stability. The invention can control the gloss of a coat applied on an object to be coated by adding a hydroxyl group-containing organic solvent and an amine compound to a water-based coating composition in which the gloss is lowered by adding a wetting agent or a binder resin.

The coating composition according to the invention is a water-based coating composition which water is added to. Pure water such as ion-exchanged water, distilled water or the like, or ultrapure water can be used as water. When the water-based coating composition is stored for long periods, water sterilized through ultraviolet light irradiation, etc., can be used to prevent fungi or bacteria from being generated. Depending on coating conditions during applying, it is possible to dilute the water-based coating composition with water.

The colorant used in the water-based coating composition according to the invention is not particularly limited, and a pigment used in a usual coating composition can be used. Organic pigments include, for example,
Pigment Yellow 12, 13, 14, 17, 20, 24, 31, 42, 53, 55, 74, 83, 86, 93, 109, 110, 117, 120, 125, 128, 129, 137, 138, 139, 147, 148, 150, 151, 152, 153, 154, 155, 166, 168, 180, 181, 184, 185, 213;
Pigment Orange 16, 36, 38, 43, 51, 55, 59, 61, 64, 65, 71;
Pigment Red 9, 48, 49, 52, 53, 57, 97, 101, 122, 123, 149, 168, 177, 180, 192, 202, 206, 215, 216, 217, 220, 223, 224, 226, 227, 228, 238, 240, 244, 254;
Pigment Violet 19, 23, 29, 30, 32, 37, 40, 50;
Pigment Blue 15, 15:1, 15:3, 15:4, 15:6, 22, 30, 60, 64, 80;
Pigment Green 7, 36;
Pigment Brown 23, 25, 26;
Pigment Black 1, 7, 26, 27 and 28; and so on.
Inorganic pigments can include titanium oxide, iron oxide, ultramarine, chrome yellow, zinc sulfide, cobalt blue, barium sulfate, calcium carbonate and so on.

The compounding amount of the pigment can optionally be determined depending on the kind of pigments to be used, etc. However, it is preferably 0.5-10% by mass, more preferably 1-5% by mass, in the water-based coating composition.

The wetting agent used in the water-based coating composition according to the invention is not particularly limited.

There can be used a wetting agent used in a usual coating composition, in general, an anionic, cationic or nonionic surface-active agent having an action of lowering interface tension between solid and liquid. When the total amount of an organic solvent in the water-based coating composition is not less than 35% by mass, the wetting agent is preferably a nonionic surface-active agent. Nonionic surface-active agents include, for example, polyoxyethylene tridecyl ether, polyoxyethylene dodecyl ether, polyoxyalkylene tridecyl ether, polyoxyethylene isodecyl ether, polyoxyethylene lauryl ether, polyoxyalkylene lauryl ether, polyoxyethylene alkyl ether, polyoxyethylene oleyl ether, polyoxyethylene styrenated phenyl ether, and so on. The compounding amount of the wetting agent can optionally be determined depending on the kind of pigments to be used, etc. It is preferably 0.01-5% by mass, more preferably 0.5-3% by mass, in the water-based coating composition.

The urethane resin having a polycarbonate group is not particularly limited, but it is preferably a urethane resin obtained by reacting a polycarbonate polyol, a polyisocyanate and a chain-elongating agent, more preferably a urethane dispersion or urethane emulsion having an average particle diameter of 30 nm to 300 nm. By using the urethane dispersion or urethane emulsion having an average particle diameter of 30 nm to 300 nm, a water-based coating composition exhibiting good storage stability can be prepared and moreover a coating film exhibiting excellent rubfastness can be formed.

The polycarbonate polyol is not particularly limited, but includes, for example, 1,6-hexanediol polycarbonate polyol, 1,4-butanediol polycarbonate polyol, poly-1,4-cyclohexane dimethylene carbonate diol, and so on.

There can be added not only the urethane resin having a polycarbonate group but also a urethane resin, as used in a usual coating composition, obtained by reacting a polyisocyanate, a polyol and a chain-elongating agent. A block structure is formed by reacting a polyisocyanate, a polyol and a chain-elongating agent, which structure improves the dispersion stability of a urethane resin in water.

Polyisocyanate components are compounds having at least two isocyanate groups therein, and include, for example, polyisocyanate compounds consisting of tolylene diisocyanate, xylene diisocyanate, diphenylmethane diisocyanate, naphthylene diisocyanate, 1,3-bis(isocyanatomethyl)cyclohexane, tetramethylxylene diisocyanate, hexamethylene diisocyanate, isophorone diisocyanate, dicyclohexylmethane diisocyanate, norbornane diisocyanate and so on. Among these polyisocyanate components, xylene diisocyanate, 1,3-bis(isocyanatomethyl)cyclohexane, hexamethylene diisocyanate, isophorone diisocyanate, 4,4'-methylene bis(cyclohexyl isocyanate) or norbornane diisocyanate is preferable. These polyisocyanate components may be used alone or in a combination of two or more.

Polyol components are compounds having at least two hydroxyl groups therein, and include, for example, polyester polyol, polyether polyol, acrylic polyol and so on.

The polyester polyol is not particularly limited, but can include, for example, polyethylene adipate, polyethylene propylene adipate, polybutylene adipate, polyhexamethylene adipate, polydiethylene adipate, polyethylene terephthalate, polyethylene isophthalate, polyhexamethylene isophthalate, polyethylene succinate, polybutylene succinate, polyethylene sebacate, polybutylene sebacate, poly-ε-caprolactam diol, poly(3-methyl-1,5-pentylene adipate) and so on.

The polyether polyol is not particularly limited, but include, for example, polyoxytetramethylene glycol, polyoxypropylene glycol, polyoxyethylene glycol, polyoxyethylene-propylene glycol and so on.

The acrylic polyol is not particularly limited, but can include, for example, those that have as an essential component an acrylic monomer such as 2-hydroxyethyl (meth)acrylate, 3-hydroxypropyl (meth)acrylate, 4-hydroxybutyl (meth)acrylate and an ε-caprolactone adduct thereof.

These polyol components may be used alone or in a combination of two or more.

The chain-elongating agent can include, for example, polyhydric alcohol having low molecular weight and polyamine having low molecular weight. Low molecular weight polyhydric alcohols include, for example, ethylene glycol, diethylene glycol, 1,4-butanediol, 1,6-hexanediol, 3-methyl-1,5-pentanediol, neopentyl glycol, trimethylolpropane, pentaerythritol, 1,4-cyclohexane dimethanol, dimethylolalkane acids such as dimethylolbutanoic acid, dimethylolpropionic acid and the like, and so on. Low molecular weight polyamines include, for example, ethylene diamine, trimethylene diamine, tetramethylene diamine, hexamethylene diamine, hydrazine, piperazine, isophorone diamine, norbornane diamine, diaminodiphenyl methane, diaminocyclohexyl methane, tolylene diamine, xylene diamine, diethylene triamine, triethylene tetramine, tetraethylene pentamine, iminobispropylamine, and so on. These chain-elongating agents may be used alone or in a combination of two or more.

There can be contained not only the urethane resin having a polycarbonate group but also an acrylic resin. The solvent resistance of a coating film is improved by containing an acrylic resin. The acrylic resin preferably includes an acrylic dispersion or acrylic emulsion having a glass transition temperature Tg of not less than 60° C. and an average particle diameter of 50 nm to 200 nm. Excellent rubfastness and alcohol resistance can be obtained by making the glass transition temperature Tg not less than 60° C. There can be prepared a water-based coating composition having good storage stability by making the average particle diameter 50 nm to 200 nm.

Monomer components constituting an acrylic resin include methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth)acrylate, phenyl (meth)acrylate, methoxyethyl (meth)acrylate, ethoxyethyl (meth)acrylate, methoxypropyl (meth)acrylate, ethoxypropyl (meth)acrylate, styrene, methyl styrene, chlorostyrene, methoxystyrene, (meth)acrylic acid, crotonic acid, itaconic acid, itaconic acid half ester, maleic acid, maleic acid half ester, 2-hydroxyethyl (meth)acrylate, 2(3)-hydroxypropyl (meth)acrylate, 4-hydroxybutyl acrylate, allyl alcohol, mono (meth)acrylic acid ester of polyhydric alcohol, (meth)acrylamide, maleic amide, 2-aminoethyl (meth)acrylate, dimethylaminoethyl (meth)acrylate, 3-aminopropyl (meth)acrylate, 2-butylaminoethyl (meth)acrylate, vinyl pyridine, glycidyl (meth)acrylate, allyl glycidyl ether, an epoxy compound having not less than two glycidyl groups, N-methylolacrylamide, vinyl acetate, vinyl chloride, ethylene, butadiene, acrylonitrile, dialkyl fumarate and so on. Among them, an acrylic resin comprising styrene, methyl methacrylate or (meth)acrylic acid is preferable.

In the water-based coating composition according to the invention, the hydroxyl group-containing organic solvent can be classified into (A) a solvent having one hydroxyl group in one molecule and (B) a solvent having two or more hydroxyl groups in one molecule.

(A) Hydroxyl group-containing organic solvents in which the number of hydroxyl groups in one molecule is one include ethylene glycol ethers such as ethylene glycol methyl ether, ethylene glycol ethyl ether, ethylene glycol propyl ether, ethylene glycol butyl ether, ethylene glycol pentyl ether, ethylene glycol hexyl ether, ethylene glycol cyclohexyl ether, ethylene glycol phenyl ether, ethylene glycol benzyl ether, ethylene glycol isobutyl ether, ethylene glycol tertiary butyl ether, diethylene glycol methyl ether, diethylene glycol ethyl ether, diethylene glycol propyl ether, diethylene glycol butyl ether, diethylene glycol pentyl ether, diethylene glycol hexyl ether, diethylene glycol cyclohexyl ether, diethylene glycol phenyl ether, diethylene glycol benzyl ether, diethylene glycol monobutyl ether, diethylene glycol isobutyl ether, triethylene glycol methyl ether, triethylene glycol ethyl ether, triethylene glycol propyl ether, triethylene glycol butyl ether, triethylene glycol pentyl ether, triethylene glycol hexyl ether, triethylene glycol cyclohexyl ether, triethylene glycol phenyl ether, triethylene glycol benzyl ether and triethylene glycol monobutyl ether; and propylene glycol ethers such as propylene glycol methyl ether, propylene glycol ethyl ether, propylene glycol propyl ether, propylene glycol butyl ether, propylene glycol pentyl ether, propylene glycol hexyl ether, propylene glycol cyclohexyl ether, dipropylene glycol methyl ether, dipropylene glycol ethyl ether, dipropylene glycol propyl ether, dipropylene glycol butyl ether, dipropylene glycol pentyl ether, dipropylene glycol hexyl ether, dipropylene glycol cyclohexyl ether, tripropylene glycol methyl ether, tripropylene glycol ethyl ether, tripropylene glycol propyl ether, tripropylene glycol butyl ether, tripropylene glycol pentyl ether, tripropylene glycol hexyl ether and tripropylene glycol cyclohexyl ether; and so on. Among them, ethylene glycol monobutyl ether, ethylene glycol isobutyl ether, ethylene glycol tertiary butyl ether, diethylene glycol monobutyl ether, diethylene glycol isobutyl ether and triethylene glycol monobutyl ether are preferable.

(B) Hydroxyl group-containing organic solvents in which the number of hydroxyl groups in one molecule is two or more include ethylene glycol, diethylene glycol, triethylene glycol, 1,2-propanediol, 2-methyl-1,3-propanediol, 1,3-propanediol, 1,2-butanediol, 1,3-butanediol, 1,4-butanediol, 3-methyl-1,3-butanediol, neopentyl glycol, 1,2-pentanediol, 1,5-pentanediol, 3-methyl-1,5-pentanediol, 1,2-hexanediol, 1,6-hexanediol, octanediol, 1,4-butylene diol, 1,4-cyclohexanedimethanol, glycerin and trimethylolpropane. Among them, ethylene glycol, diethylene glycol, triethylene glycol, propylene glycol, dipropylene glycol, tripropylene glycol, 3-methyl-1,3-butanediol, 2-methyl-1,3-propanediol and glycerin are preferable.

In the hydroxyl group-containing organic solvent, the ratio of (A) a solvent having one hydroxyl group in one molecule to (B) a solvent having two or more hydroxyl groups in one molecule is preferably A:B=100:50 to 100:170, more preferably 100:50 to 100:150, even more preferably 100:75 to 100:150, from the viewpoint of continuous discharge stability and gloss properties. When A is 100, if B is less than 50, moisture retention becomes worse and the clogging of a nozzle is caused in an ink jet coating or a spray coating, etc., and hence continuous discharge stability may be reduced. While, if B exceeds 170, the gloss of a dried coat tends to be lowered.

In the water-based coating composition according to the invention, the total amount of an organic solvent is preferably 20% by mass to 55% by mass, more preferably 30% by mass to 50% by mass, from the viewpoint of continuous discharge stability and storage stability. When the total amount of the organic solvent is less than 20% by mass, the drying of the water-based coating composition becomes faster and the clogging of a nozzle is often caused in an ink jet coating or a spray coating, etc., and hence continuous discharge stability is reduced. While, when it exceeds 55% by mass, the aggregation of a pigment dispersion and a resin is caused and storage stability tends to become worse. In the water-based coating composition according to the invention, even if the amount of the solvent added is 55% by mass, there is no burning point and hence it has higher safety than that of a solvent-based material.

The amine compound used in the water-based coating composition according to the invention include a primary amine, a secondary amine and a tertiary amine.

The primary amine includes, for example, methylamine, ethylamine, propylamine, isopropylamine, butylamine, t-butylamine, hexylamine, benzylamine, ethanolamine, isopropanolamine, butanolamine, hexanolamine, 1,2-propanediamine, 1,3-propanediamine, 1,4-butanediamine, 1,6-hexanediamine, pyrrolidine, morpholine and so on.

The secondary amine includes, for example, dimethylamine, diethylamine, dipropylamine, diisopropylamine, dibutylamine, diethanolamine, diisopropanolamine, N-methylethanolamine, N-ethylethanolamine, N-butylethanolamine, N-butylisopropanolamine, N-t-butylisopropanolamine, N,N-diethylethylenediamine, N,N-dimethyl-1,3-diaminopropane, N,N-diethyl-1,3-diaminopropane, piperazine and so on.

The tertiary amines includes, for example, trimethylamine, triethylamine, tripropylamine, triisopropylamine, tributylamine, N-methyldiethylamine, N,N-dimethylpropylamine, triethanolamine, N-methyldiethanolamine, N-ethyldiethanolamine, N-butyldiethanolamine, N-t-butyldiethanolamine, N,N-dimethylethanolamine, N,N-diethylethanolamine, N,N-dibutylethanolamine, N,N-di-t-butylethanolamine, triisopropanolamine, N-methyldiisopropanolamine, N-ethyldiisopropanolamine, N-butyldiisopropanolamine, N-t-butyldiisopropanolamine, N,N-dimethylisopropanolamine, N,N-diethylisopropanolamine, N,N-dibutylisopropanolamine, N,N-di-t-butylisopropanolamine, and so on.

Needless to say, the invention is not limited to these amine compounds. These amine compounds may be used in a combination of two or more.

In the invention, a straight-chain amine compound or a water-soluble tertiary amine compound is particularly preferable among the amine compounds. Specifically, it is particularly preferable to use triethylamine, triethanolamine, N-methyldiethanolamine, N-ethyldiethanolamine, N,N-dimethylethanolamine, N,N-diethylethanolamine or the like.

The boiling point range of the amine compound used in the invention is preferably −60° C. to +170° C., more preferably −20° C. to +170° C., even more preferably −10° C. to +140° C., based on a solvent having the lowest boiling point in the hydroxyl group-containing organic solvent from the viewpoint of the gloss of a coat and continuous discharge stability. When the boiling point of the amine compound is a temperature less than −60° C., the amine compound is evaporated faster than the hydroxyl group-containing organic solvent in the drying step of the water-based coating composition and the aggregation of a resin progresses rapidly, and hence the gloss of a coat and continuous discharge stability tend to be reduced. While, when it is a temperature higher than +170° C., drying properties tend to become worse.

In the water-based coating composition according to the invention, the ratio of the amine compound to the hydroxyl group-containing organic solvent is preferably 0.0005-0.1, more preferably 0.001-0.05, from the viewpoint of gloss properties and water resistance. When the ratio of the amine compound to the hydroxyl group-containing organic solvent is less than 0.0005, gloss tends to become worse. While, when it exceeds 0.1, the amine remains in a coat and hence water resistance tends to become worse.

In the water-based coating composition according to the invention, a common material can be used as an object to be coated as long as size, thickness and shape are suitable for coating. Preliminary surface treatment or coating of the object may also be carried out. The object to be coated includes, as a material hardly-absorbing the water-based coating composition, an iron plate, an aluminum plate, a stainless plate, a ceramic coated plate, and a resin sheet using as a main component a resin such as polyethylene terephthalate (PET), polycarbonate, acrylonitrile butadiene styrene (ABS), vinyl chloride, acrylic, polyester or the like, or a molded product thereof. These objects to be coated are used to achieve good adhesive properties and gloss. Moreover, coating without bleeding can be performed on paper or fabric which has the absorbability to the water-based coating composition.

The water-based coating composition according to the invention may comprise an antifoamer, a surface conditioner, an anti-settling agent, an ultraviolet light absorber, a light stabilizer or the like in order to impart various functions as a coating film.

EXAMPLES

The invention will be described in more detail below with reference to Examples and Comparative Examples. Concerning the description of Examples and Comparative Examples, "part(s)" and "%" are based on mass criteria.

<Synthesis of Resin 1 (Polycarbonate Group-Containing Urethane Dispersion)>

100.0 parts of 1,6-hexanediol polycarbonate polyol (average molecular weight of 2000), 4.0 parts of neopentyl glycol, 1.0 part of trimethylolpropane, 10.0 parts of 1,4-cyclohexanedimethanol, 8.0 parts of dimethylolpropionic acid, 0.001 parts of dibutyl tin dilaurate and 110.0 parts of methyl ethyl ketone are charged into a four-necked flask provided with a stirrer, a reflux condenser, a thermometer and a tube for introducing nitrogen. They are homogeneously mixed. Thereafter, 80.0 parts of 4,4'-methylene bis(cyclohexyl isocyanate) is added and reacted at 70° C. for 6 hours to obtain a solution of a carboxyl group-containing isocyanate group-terminated prepolymer in methyl ethyl ketone. The solution is cooled down to 40° C. or less and then added with 6.0 parts of triethylamine, and thereafter a neutralization reaction is carried out at 40° C. for 30 minutes.

Then, the neutralized solution is cooled down to 30° C. or less and slowly added with 430.0 parts of water using a disper blade to obtain a dispersion in which the neutralized product of a polycarbonate group-containing isocyanate group-terminated prepolymer is dispersed. The dispersion is added dropwise with an amine aqueous solution formed by dissolving 1.35 parts of diethylene triamine in 20.0 parts of water and further added with 5.0 parts of a 50% hydrazine aqueous solution, and then reacted for 2 hours. Thereafter, a desolvation treatment is carried out under reduced pressure at 30° C. to obtain a polycarbonate group-containing polyurethane dispersion having a solid content of 35%, a viscosity of 40 mPa·s, an acid value=15, an average particle diameter (d50)=30 nm and Tg=45° C.

<Synthesis of Resin 2 (Polycarbonate Group-Containing Urethane Dispersion)>

100.0 parts of 1,4-butanediol polycarbonate polyol (average molecular weight of 2000), 4.0 parts of neopentyl glycol, 1.0 part of trimethylolpropane, 10.0 parts of 1,4-cyclohexanedimethanol, 8.0 parts of dimethylolpropionic acid, 0.001 parts of dibutyl tin dilaurate and 110.0 parts of methyl ethyl ketone are charged into a four-necked flask provided with a stirrer, a reflux condenser, a thermometer and a tube for introducing nitrogen. They are homogeneously mixed. Thereafter, 80.0 parts of 4,4'-methylene bis(cyclohexyl isocyanate) is added and reacted at 70° C. for 6 hours to obtain a solution of a carboxyl group-containing isocyanate group-terminated prepolymer in methyl ethyl ketone. The solution is cooled down to 40° C. or less and then added with 6.0 parts of triethylamine, and thereafter a neutralization reaction is carried out at 40° C. for 30 minutes.

Then, the neutralized solution is cooled down to 30° C. or less and slowly added with 430.0 parts of water using a disper blade to obtain a dispersion in which the neutralized product of a polycarbonate group-containing isocyanate group-terminated prepolymer is dispersed. The dispersion is added dropwise with an amine aqueous solution formed by dissolving 1.35 parts of diethylene triamine in 20.0 parts of water and further added with 5.0 parts of a 50% hydrazine aqueous solution, and then reacted for 2 hours. Thereafter, a desolvation treatment is carried out under reduced pressure at 30° C. to obtain a polycarbonate group-containing polyurethane dispersion having a solid content of 35%, a viscosity of 46 mPa·s, an acid value=15, an average particle diameter (d50)=34 nm and Tg=50° C.

<Synthesis of Resin 3 (Polycarbonate Group-Containing Urethane Dispersion)>

100.0 parts of poly-1,4-cyclohexane dimethylene carbonate diol (average molecular weight of 2000), 14.0 parts of neopentyl glycol, 1.0 part of trimethylolpropane, 8.0 parts of dimethylolpropionic acid, 0.001 parts of dibutyl tin dilaurate and 110.0 parts of methyl ethyl ketone are charged into a four-necked flask provided with a stirrer, a reflux condenser, a thermometer and a tube for introducing nitrogen. They are homogeneously mixed. Thereafter, 31.0 parts of hexamethylene diisocyanate and 41.0 parts of 4,4'-methylene bis(cyclohexyl isocyanate) are added and reacted at 70° C. for 6 hours to obtain a solution of a carboxyl group-containing isocyanate group-terminated prepolymer in methyl ethyl ketone. The solution is cooled down to 40° C. or less and then added with 6.0 parts of triethylamine, and thereafter a neutralization reaction is carried out at 40° C. for 30 minutes.

Then, the neutralized solution is cooled down to 30° C. or less and slowly added with 430.0 parts of water using a disper blade to obtain a dispersion in which the neutralized product of a polycarbonate group-containing isocyanate group-terminated prepolymer is dispersed. The dispersion is added dropwise with an amine aqueous solution formed by dissolving 1.35 parts of diethylene triamine in 20.0 parts of water and further added with 5.0 parts of a 50% hydrazine aqueous solution, and then reacted for 2 hours. Thereafter, a desolvation treatment is carried out under reduced pressure at 30° C. to obtain a polycarbonate group-containing polyurethane dispersion having a solid content of 35%, a viscosity of 52 mPa·s, an acid value=17, an average particle diameter (d50)=39 nm and Tg=40° C.

<Synthesis of Resin 4 (Urethane Dispersion Containing No Polycarbonate Group)>

20.0 parts of neopentyl glycol, 1.0 part of trimethylolpropane, 5.5 parts of 1,4-cyclohexanedimethanol, 5.5 parts of dimethylolpropionic acid, 0.001 parts of dibutyl tin dilaurate and 110.0 parts of methyl ethyl ketone are charged into a four-necked flask provided with a stirrer, a reflux condenser, a thermometer and a tube for introducing nitrogen. They are homogeneously mixed. Thereafter, 12.0 parts of hexamethylene diisocyanate and 82.0 parts of 4,4'-methylene bis(cyclohexyl isocyanate) are added and reacted at 70° C. for 6 hours to obtain a solution of a carboxyl group-containing isocyanate group-terminated prepolymer in methyl ethyl ketone. The solution is cooled down to 40° C. or less and then added with 4.2 parts of triethylamine, and thereafter a neutralization reaction is carried out at 40° C. for 30 minutes.

Then, the neutralized solution is cooled down to 30° C. or less and slowly added with 250.0 parts of water using a disper blade to obtain a dispersion in which the neutralized product of an isocyanate group-terminated prepolymer is dispersed. The dispersion is added dropwise with an amine aqueous solution formed by dissolving 1.35 parts of diethylene triamine in 20.0 parts of water and further added with 5.0 parts of a 50% hydrazine aqueous solution, and then reacted for 2 hours. Thereafter, a desolvation treatment is carried out under reduced pressure at 30° C. to obtain a stable polyurethane dispersion containing no polycarbonate group which has a solid content of 35%, a viscosity of 61 mPa·s, an acid value=20, an average particle diameter (d50)=40 nm and Tg=50° C.

<Synthesis of Resin 5 (Acrylic Resin Dispersion)>

60 parts of water, 0.6 parts of polyoxyethylene styryl phenyl ether sulfuric acid ester ammonium salt and 2 parts of polyoxyalkylene alkyl ether are charged into a four-necked flask provided with a stirrer, a reflux condenser and a thermometer, heated to 70° C. and added with 0.2 parts of potassium persulfate. Then, a mixture of 7.0 parts of butyl acrylate, 0.8 parts of acrylic acid, 24.0 parts of styrene and 48.2 parts of methyl methacrylate is added dropwise. Thereafter, 60 parts of water is added and adjusted with an aqueous ammonia so as to have pH=9. There is obtained a good acrylic resin dispersion having a solid content=41%, an average particle diameter (d50)=75 nm, Tg=81° C. and an acid value=8.

<Coating Composition>

Carbon black (product name: Special Black 550 made by Evonik Degussa), copper phthalocyanine (product name: Irgalite Blue 8700 made by Ciba), quinoxalinedione (product name: Hostaperm Yellow H5G made by Clariant), dimethyl quinacridone (product name: Super Magenta RG made by DIC), titanium dioxide (product name: TR92 made by Huntsman) are used as a pigment.

Polyoxyethylene styrenated phenyl ether (HLB=14, 18), polyoxyethylene tridecyl ether (HLB=13), polyoxyethylene lauryl ether (HLB=14), polyoxyethylene isodecyl ether (HLB=16) are used as a wetting agent.

SN Defoamer 1312 (made by San Nopco Limited) is used as an antifoamer A and EnviroGem AD01 (made by Air Products) is used as an antifoamer B.

TSF4446 (polyether-modified silicone oil made by Momentive) is used as a surface conditioner A and BYK349 (polyether-modified siloxane made by BYK Chemie Japan) is used as a surface conditioner B.

Preparation of Coating Composition

Examples 1-252

An antifoamer, a hydroxyl group-containing organic solvent (having one hydroxyl group in one molecule), a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 1-5, a surface conditioner, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

Examples 253-263

A hydroxyl group-containing organic solvent (having one hydroxyl group in one molecule), a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 1 and 5, a surface conditioner, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

Examples 264-274

An antifoamer, a hydroxyl group-containing organic solvent (having one hydroxyl group in one molecule), a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 1 and 5, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

Examples 275-285

A hydroxyl group-containing organic solvent (having one hydroxyl group in one molecule), a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 1 and 5, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

Comparative Example 1

An antifoamer, a hydroxyl group-containing organic solvent (having one hydroxyl group in one molecule), a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 4 and 5, a surface conditioner, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

Comparative Example 2

An antifoamer, a hydroxyl group-containing organic solvent (having one hydroxyl group in one molecule), a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 4 and 5, a surface conditioner, a hydroxyl group-containing organic solvent (having two or more hydroxyl groups in one molecule) and ion-exchanged water (70% of the total amount of water added) are added and sufficiently stirred using a disper to prepare a water-based coating composition.

Comparative Example 3

An antifoamer, a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 4 and 5, a surface conditioner, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

Comparative Example 4

An antifoamer, a pigment, a wetting agent and ion-exchanged water (30% of the total amount of water added) are mixed and then kneaded together using a bead mill until the average particle diameter (d50) of the pigment is 80 nm to 120 nm. Thereafter, the obtained resins 1 and 5, a surface conditioner, an amine compound and ion-exchanged water (70% of the total amount of water added) are added and sufficiently stirred using a disper to prepare a water-based coating composition.

Comparative Example 5

An antifoamer, a hydroxyl group-containing organic solvent (having one hydroxyl group in one molecule), a pigment and ion-exchanged water (30% of the total amount of water added) are mixed and then kneaded together using a bead mill until the average particle diameter (d50) of the pigment is 80 nm to 120 nm. Thereafter, the obtained resins 1 and 5, a hydroxyl group-containing organic solvent (having two or more hydroxyl groups in one molecule), an amine compound and ion-exchanged water (70% of the total amount of water added) are added and sufficiently stirred using a disper to prepare a water-based coating composition.

The resulting water-based coating compositions are evaluated according to the following methods. The results are shown in Table 1 to Table 19.

<Continuous Discharge Properties>

The area of 1 m×4 m of a vinyl chloride sheet is coated with the water-based coating composition using Ramirez PJ-1304NX, and it is evaluated according to the following criteria based on the number of flying bend and omission.
A: There is no flying bend and omission.
B: The total number of flying bend and omission is 1 to 9.
C: The total number of flying bend and omission is not less than 10.

<Storage Stability>

The water-based coating composition is stored at 50° C. for 28 days while leaving at rest, and it is evaluated by visual observation on the basis of the following criteria.
A: There is no change.
B: There is a small amount of suspended matter.
C: Precipitation or separation is caused.

<Gloss>

The surface of a vinyl chloride sheet is coated with the water-based coating composition using Ramirez PJ-1304NX made by Mutoh Industries Ltd., and then the gloss of the coated surface which is sufficiently dried is measured using a glossmeter VG 2000 made by Nippon Denshoku Industries Co., Ltd.

<Wetting Properties>

The area of 10 cm×10 cm of a vinyl chloride sheet is coated with the water-based coating composition using Ramirez PJ-1304NX made by Mutoh Industries Ltd., and it is evaluated by visual observation on the basis of the following criteria.
A: The whole surface is uniformly printed.
B: Cissing is observed in part of the area.
C: Cissing is observed in approximately half of the area.

TABLE 1

| | Boiling point | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group — Ethylene glycol monobutyl ether | 171° C. | 20.00 | 20.00 | 20.00 | 20.00 | 20.00 | 20.00 | 20.00 | 20.00 | 20.00 | 20.00 | 20.00 | 20.00 | 20.00 | 20.00 |
| Ethylene glycol isobutyl ether | 160° C. | | | | | | | | | | | | | | |
| Ethylene glycol tertiary butyl ether | 153° C. | | | | | | | | | | | | | | |
| Diethylene glycol monobutyl ether | 230° C. | | | | | | | | | | | | | | |
| Diethylene glycol isobutyl ether | 220° C. | | | | | | | | | | | | | | |
| Triethylene glycol monobutyl ether | 278° C. | | | | | | | | | | | | | | |
| Organic solvent having two or more hydroxyl groups — Ethylene glycol | 198° C. | 29.50 | | | | | | | | | | | | | |
| Diethylene glycol | 245° C. | | 29.50 | | | | | | | | | | | | |
| Triethylene glycol | 285° C. | | | 29.50 | | | | | | | | | | | |
| Propylene glycol | 188° C. | | | | 29.50 | | | | | | | | | | |
| Dipropylene glycol | 232° C. | | | | | 29.50 | | | | | | | | | |
| Tripropylene glycol | 271° C. | | | | | | 29.50 | | | | | | | | |
| 1,2-butanediol | 193° C. | | | | | | | 29.50 | | | | | | | |
| 1,4-butanediol | 228° C. | | | | | | | | 29.50 | | | | | | |
| 3-methyl-1,3-butanediol | 203° C. | | | | | | | | | 29.50 | | | | | |
| 2-methyl-1,3-propanediol | 213° C. | | | | | | | | | | 29.50 | | | | |
| Glycerin | 290° C. | | | | | | | | | | | 29.50 | | | |
| Organic solvent Amines — Ethanolamine | 171° C. | | | | | | | | | | | | 29.50 | | |
| Diethanolamine | 269° C. | | | | | | | | | | | | | 29.50 | |
| Triethanolamine | 335° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| N,N-dimethylethanolamine | 135° C. | | | | | | | | | | | | | | |
| N,N-diethylethanolamine | 162° C. | | | | | | | | | | | | | | |
| N,N-dibutylethanolamine | 229° C. | | | | | | | | | | | | | | |
| N-methyldiethanolamine | 247° C. | | | | | | | | | | | | | | |
| N-ethyldiethanolamine | 247° C. | | | | | | | | | | | | | | |
| N-butyldiethanolamine | 265° C. | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 164.0 | 164.0 | 164.0 | 164.0 | 164.0 | 164.0 | 164.0 | 164.0 | 164.0 | 164.0 | 164.0 | 175.0 | 175.0 | 175.0 |
| Ratio of moncol to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |
| Gloss | | 84 | 82 | 87 | 89 | 88 | 84 | 86 | 81 | 86 | 88 | 85 | 87 | 82 | 87 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 2

| | Boiling point | \multicolumn{14}{c|}{Examples} |
|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group — Ethylene glycol monobutyl ether | 171° C. | 20.00 | 20.00 | 20.00 | 20.00 | 20.00 | 20.00 | 20.00 | 20.00 | 20.00 | 20.00 | 20.00 | 20.00 | 20.00 | 20.00 |
| Ethylene glycol isobutyl ether | 160° C. | | | | | | | | | | | | | | |
| Ethylene glycol tertiary butyl ether | 153° C. | | | | | | | | | | | | | | |
| Diethylene glycol monobutyl ether | 230° C. | | | | | | | | | | | | | | |
| Diethylene glycol isobutyl ether | 220° C. | | | | | | | | | | | | | | |
| Triethylene glycol monobutyl ether | 278° C. | | | | | | | | | | | | | | |
| Organic solvent having two or more hydroxyl groups — Ethylene glycol | 198° C. | 29.50 | | | | | | | | | | | | | |
| Diethylene glycol | 245° C. | | 29.50 | | | | | | | | | | | | |
| Triethylene glycol | 285° C. | | | 29.50 | | | | | | | | | | | |
| Propylene glycol | 188° C. | | | | 29.50 | | | | | | | | | | |
| Dipropylene glycol | 232° C. | | | | | 29.50 | | | | | | | | | |
| Tripropylene glycol | 271° C. | | | | | | 29.50 | | | | | | | | |
| 1,2-butanediol | 193° C. | | | | | | | 29.50 | | | | | | | |
| 1,4-butanediol | 228° C. | | | | | | | | 29.50 | | | | | | |
| 3-methyl-1,3-butanediol | 203° C. | | | | | | | | | 29.50 | | | | | |
| 2-methyl-1,3-propanediol | 213° C. | | | | | | | | | | 29.50 | | | | |
| Glycerin | 290° C. | | | | | | | | | | | 29.50 | | | |
| Organic solvent Amines — Ethanolamine | 171° C. | | | | | | | | | | | | 29.50 | | |
| Diethanolamine | 269° C. | | | | | | | | | | | | | 29.50 | |
| Triethanolamine | 335° C. | | | | | | | | | | | | | | 29.50 |
| N,N-dimethylethanolamine | 135° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| N,N-diethylethanolamine | 162° C. | | | | | | | | | | | | | | |
| N,N-dibutylethanolamine | 229° C. | | | | | | | | | | | | | | |
| N-methyldiethanolamine | 247° C. | | | | | | | | | | | | | | |
| N-ethyldiethanolamine | 247° C. | | | | | | | | | | | | | | |
| N-butyldiethanolamine | 265° C. | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 175.0 | 175.0 | 175.0 | 175.0 | 175.0 | 175.0 | 175.0 | 175.0 | 182.5 | 182.5 | 182.5 | 182.5 | 182.5 | 182.5 |
| Ratio of moncol to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |
| Gloss | | 81 | 85 | 84 | 85 | 82 | 82 | 87 | 89 | 88 | 84 | 86 | 88 | 85 | 87 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 3

| | | Examples | | | | | | | | | | | | | |
|---|---|---|---|---|---|---|---|---|---|---|---|---|---|---|---|
| | | 29 | 30 | 31 | 32 | 33 | 34 | 35 | 36 | 37 | 38 | 39 | 40 | 41 | 42 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Boiling point | | | | | | | | | | | | | | |
| Ethylene glycol monobutyl ether | 171° C. | 20.00 | 20.00 | 20.00 | 20.00 | | | | | | | | | | |
| Ethylene glycol isobutyl ether | 160° C. | | | | | | | | | | | | | | |
| Ethylene glycol tertiary butyl ether | 153° C. | | | | | | | | | | | | | | |
| Diethylene glycol monobutyl ether | 230° C. | | | | | | 20.00 | 20.00 | 20.00 | 20.00 | 20.00 | 20.00 | 20.00 | 20.00 | 20.00 |
| Diethylene glycol isobutyl ether | 220° C. | | | | | | | | | | | | | | |
| Triethylene glycol monobutyl ether | 278° C. | | | | | | | | | | | | | | |
| Organic solvent having two or more hydroxyl groups | | | | | | | | | | | | | | | |
| Ethylene glycol | 198° C. | | | | | | 29.50 | | | | | | | | |
| Diethylene glycol | 245° C. | 29.50 | | | | | | 29.50 | | | | | | | |
| Triethylene glycol | 285° C. | | | | | | | | 29.50 | | | | | | |
| Propylene glycol | 188° C. | | | | | | | | | 29.50 | | | | | |
| Dipropylene glycol | 232° C. | | | | | | | | | | 29.50 | | | | |
| Tripropylene glycol | 271° C. | | | | | | | | | | | 29.50 | | | |
| 1,2-butanediol | 193° C. | | | | | | | | | | | | 29.50 | | |
| 1,4-butanediol | 228° C. | | 29.50 | | | | | | | | | | | | |
| 3-methyl-1,3-butanediol | 203° C. | | | 29.50 | | | | | | | | | | 29.50 | |
| 2-methyl-1,3-propanediol | 213° C. | | | | 29.50 | | | | | | | | | | 29.50 |
| Glycerin | 290° C. | | | | | 29.50 | | | | | | | | | |
| Organic solvent Amines | | | | | | | | | | | | | | | |
| Ethanolamine | 171° C. | | | | | | | | | | | | | | |
| Diethanolamine | 269° C. | | | | | | | | | | | | | | |
| Triethanolamine | 335° C. | | | | | | | | | | | | | | |
| N,N-dimethylethanolamine | 135° C. | | | | | | | | | | | | | | |
| N,N-diethylethanolamine | 162° C. | | | | | | | | | | | | | | |
| N,N-dibutylethanolamine | 229° C. | | | | | | | | | | | | | | |
| N-methyldiethanolamine | 247° C. | | | | | | | | | | | | | | |
| N-ethyldiethanolamine | 247° C. | | | | | | | | | | | | | | |
| N-butyldiethanolamine | 265° C. | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 182.5 | 182.5 | 182.5 | 182.5 | 182.5 | 137.0 | 105.0 | 105.0 | 147.0 | 105.0 | 105.0 | 142.0 | 107.0 | 132.0 |
| Ratio of monool to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |
| Gloss | | 85 | 80 | 86 | 85 | 85 | 85 | 82 | 87 | 89 | 86 | 84 | 83 | 85 | 86 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 4

| | | Examples | | | | | | | | | | | | | |
|---|---|---|---|---|---|---|---|---|---|---|---|---|---|---|---|
| | | 43 | 44 | 45 | 46 | 47 | 48 | 49 | 50 | 51 | 52 | 53 | 54 | 55 | 56 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Boiling point | | | | | | | | | | | | | | |
| Ethylene glycol monobutyl ether | 171° C. | 20.00 | | | | | | | | | | | | | |
| Ethylene glycol isobutyl ether | 160° C. | | 20.00 | | | | | | | | | | | | |
| Ethylene glycol tertiary butyl ether | 153° C. | | | | | | | | | | | | | | |
| Diethylene glycol monobutyl ether | 230° C. | | | | | | | | | | | | | | |
| Diethylene glycol isobutyl ether | 220° C. | | | | | | | | | | | | | | |
| Triethylene glycol monobutyl ether | 278° C. | | | 20.00 | 20.00 | 20.00 | 20.00 | 20.00 | 20.00 | 20.00 | 20.00 | 20.00 | 20.00 | 20.00 | 20.00 |
| Organic solvent having two or more hydroxyl groups | | | | | | | | | | | | | | | |
| Ethylene glycol | 198° C. | | | 29.50 | | | | | | | | | | | |
| Diethylene glycol | 245° C. | | | | 29.50 | | | | | | | | | | |
| Triethylene glycol | 285° C. | | | | | 29.50 | | | | | | | | | |
| Propylene glycol | 188° C. | | | | | | 29.50 | | | | | | | | |
| Dipropylene glycol | 232° C. | | | | | | | 29.50 | | | | | | | |
| Tripropylene glycol | 271° C. | | | | | | | | 29.50 | | | | | | |
| 1,2-butanediol | 193° C. | | | | | | | | | 29.50 | | | | | |
| 1,4-butanediol | 228° C. | | | | | | | | | | 29.50 | | | | |
| 3-methyl-1,3-butanediol | 203° C. | | | | | | | | | | | 29.50 | | | |
| 2-methyl-1,3-propanediol | 213° C. | 29.50 | | | | | | | | | | | 29.50 | | |
| Glycerin | 290° C. | | 29.50 | | | | | | | | | | | 29.50 | 29.50 |
| Organic solvent Amines | | | | | | | | | | | | | | | |
| Ethanolamine | 171° C. | 0.50 | | | | | | | | | | | | | |
| Diethanolamine | 269° C. | | 0.50 | | | | | | | | | | | | |
| Triethanolamine | 335° C. | | | 0.50 | | | | | | | | | | | |
| N,N-dimethylethanolamine | 135° C. | | | | 0.50 | | | | | | | | | | |
| N,N-diethylethanolamine | 162° C. | | | | | 0.50 | | | | | | | | | |
| N,N-dibutylethanolamine | 229° C. | | | | | | 0.50 | | | | | | | | |
| N-methyldiethanolamine | 247° C. | | | | | | | 0.50 | | | | | | | |
| N-ethyldiethanolamine | 247° C. | | | | | | | | 0.50 | | | | | | |
| N-butyldiethanolamine | 265° C. | | | | | | | | | 0.50 | 0.50 | 0.50 | 0.50 | 0.50 | 0.50 |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 122.0 | 105.0 | 137.0 | 115.0 | 115.0 | 147.0 | 115.0 | 115.0 | 142.0 | 115.0 | 132.0 | 122.0 | 115.0 | 137.0 |
| Ratio of monool to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |
| Gloss | | 88 | 85 | 86 | 88 | 82 | 84 | 88 | 81 | 80 | 84 | 86 | 88 | 82 | 85 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 5

| | | Boiling point | Examples |||||||||||||| 
| | | | 57 | 58 | 59 | 60 | 61 | 62 | 63 | 64 | 65 | 66 | 67 | 68 | 69 | 70 |
|---|---|---|---|---|---|---|---|---|---|---|---|---|---|---|---|---|
| Copper phthalocyanine | | | 1.50 | 1.50 | 1.50 | 1.50 | 1.50 | 1.50 | 1.50 | 1.50 | 1.50 | 1.50 | | | | |
| Quinoxalinedione | | | | | | | | | | | | | 3.00 | | | |
| Dimethyl quinacridone | | | | | | | | | | | | | | 3.00 | | |
| Carbon black | | | | | | | | | | | | | | | 3.00 | |
| Titanium dioxide | | | | | | | | | | | | | | | | 15.00 |
| Polyoxyethylene styrenated phenyl ether (HLB = 14) | | | 0.50 | 0.50 | 0.50 | 0.50 | 0.50 | 0.50 | 0.50 | 0.50 | 0.50 | 0.50 | 1.00 | 1.00 | 1.00 | 1.00 |
| Resin 1 | | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | | |
| Resin 3 | | | | | | | | | | | | | | | | |
| Resin 4 | | | | | | | | | | | | | | | | |
| Resin 5 | | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | | 35.49 | 35.49 | 35.49 | 35.49 | 35.49 | 35.49 | 35.49 | 35.49 | 35.49 | 35.49 | 33.49 | 33.49 | 33.49 | 21.49 |
| Organic solvent having one hydroxyl group | Ethylene glycol monobutyl ether | 171° C. | | | | | | | | | | | | | | |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | | | | | | | | | | |
| | Diethylene glycol isobutyl ether | 220° C. | | | | | | | | | | | | | | |
| | Triethylene glycol monobutyl ether | 278° C. | 20.00 | 20.00 | 20.00 | 20.00 | 20.00 | 20.00 | 20.00 | 20.00 | 20.00 | | 20.00 | 20.00 | 20.00 | 20.00 |
| Organic solvent having two or more hydroxyl groups | Ethylene glycol | 198° C. | 29.50 | | | | | | | | | | | | | |
| | Diethylene glycol | 245° C. | | 29.50 | | | | | | | | | | | | |
| | Triethylene glycol | 285° C. | | | 29.50 | | | | | | | | | | | |
| | Propylene glycol | 188° C. | | | | 29.50 | | | | | | | | | | |
| | Dipropylene glycol | 232° C. | | | | | 29.50 | | | | | | | | | |
| | Tripropylene glycol | 271° C. | | | | | | 29.50 | | | | | | | | |
| | 1,2-butanediol | 193° C. | | | | | | | 29.50 | | | | | | | |
| | 1,4-butanediol | 228° C. | | | | | | | | 29.50 | | | | | | |
| | 3-methyl-1,3-butanediol | 203° C. | | | | | | | | | 29.50 | | | | | |
| | 2-methyl-1,3-propanediol | 213° C. | | | | | | | | | | | 29.50 | 29.50 | 29.50 | 29.50 |
| | Glycerin | 290° C. | | | | | | | | | | 29.50 | | | | |
| Organic solvent Amines | Ethanolamine | 171° C. | | | | | | | | | | | | | | |
| | Diethanolamine | 269° C. | | | | | | | | | | | | | | |
| | Triethanolamine | 335° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| | N,N-dimethylethanolamine | 135° C. | | | | | | | | | | | | | | |
| | N,N-diethylethanolamine | 162° C. | | | | | | | | | | | | | | |
| | N,N-dibutylethanolamine | 229° C. | | | | | | | | | | | | | | |
| | N-methyldiethanolamine | 247° C. | | | | | | | | | | | | | | |
| | N-ethyldiethanolamine | 247° C. | | | | | | | | | | | | | | |
| | N-butyldiethanolamine | 265° C. | | | | | | | | | | | | | | |
| Total | | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | | 90.0 | 57.0 | 147.0 | 103.0 | 64.0 | 142.0 | 107.0 | 132.0 | 122.0 | 57.0 | 137.0 | 137.0 | 137.0 | 137.0 |
| Ratio of monool to diol | | | 0.68 | 0.68 | 0.68 | 0.68 | 0.68 | 0.68 | 0.68 | 0.68 | 0.68 | 0.68 | 0.68 | 0.68 | 0.68 | 0.68 |

TABLE 5-continued

| | Examples | | | | | | | | | | | | | |
|---|---|---|---|---|---|---|---|---|---|---|---|---|---|
| | 57 | 58 | 59 | 60 | 61 | 62 | 63 | 64 | 65 | 66 | 67 | 68 | 69 | 70 |
| Ratio of amine | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | 50% | 50% | 50% | 50% | 50% | 50% | 50% | 50% | 50% | 50% | 50% | 50% | 50% | 50% |
| Gloss | 88 | 84 | 86 | 88 | 82 | 85 | 84 | 84 | 88 | 84 | 86 | 85 | 82 | 84 |
| Continuous discharge stability | A | A | A | A | A | A | A | A | A | A | A | A | A | A |
| Storage stability | A | A | A | A | A | A | A | A | A | A | A | A | A | A |
| Wetting properties | A | A | A | A | A | A | A | A | A | A | A | A | A | A |

TABLE 6

| | | Examples | | | | | | | | | | | | |
|---|---|---|---|---|---|---|---|---|---|---|---|---|---|---|
| | | 71 | 72 | 73 | 74 | 75 | 76 | 77 | 78 | 79 | 80 | 81 | 82 | 83 | 84 |
| Copper phthalocyanine | | 3.00 | | | | | | | | | | | | | |
| Quinoxalinedione | | | 3.00 | | | | | | | | | | | | |
| Dimethyl quinacridone | | | | 3.00 | | | | | | | | | | | |
| Carbon black | | | | | | 3.00 | 3.00 | | | | | | | | |
| Titanium dioxide | | | | | 15.00 | | | | 15.00 | | | | 15.00 | | |
| Polyoxyethylene styrenated phenyl ether (HLB = 14) | | | | | | | | | | | | | | | |
| Resin 1 | | 1.00 | 1.00 | 1.00 | 1.00 | 1.00 | 1.00 | 1.00 | 1.00 | 1.00 | 1.00 | 1.00 | 1.00 | 1.00 | 1.00 |
| Resin 2 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 33.49 | 33.49 | 33.49 | 21.49 | 33.49 | 33.49 | 33.49 | 21.49 | 33.49 | 33.49 | 33.49 | 21.49 | 33.49 | 33.49 |
| Organic solvent having one hydroxyl group | Ethylene glycol monobutyl ether — Boiling point 171° C. | | | | | | | | | | | | | | |
| | Ethylene glycol isobutyl ether — 160° C. | | | | | | | | | | | | | | |
| | Ethylene glycol tertiary butyl ether — 153° C. | | | | | | | | | | | | | | |
| | Diethylene glycol monobutyl ether — 230° C. | | | | | | | | | | | | | | |
| | Diethylene glycol isobutyl ether — 220° C. | 20.00 | 20.00 | 20.00 | 20.00 | 20.00 | 20.00 | 20.00 | 20.00 | 20.00 | 20.00 | 20.00 | 20.00 | 20.00 | 20.00 |
| | Triethylene glycol monobutyl ether — 278° C. | | | | | | | | | | | | | | |
| Organic solvent having two or more hydroxyl groups | Ethylene glycol — 198° C. | 29.50 | 29.50 | 29.50 | 29.50 | 29.50 | 29.50 | 29.50 | 29.50 | | | | | | |
| | Diethylene glycol — 245° C. | | | | | | | | | | | | | | |
| | Triethylene glycol — 285° C. | | | | | | | | | | | | 29.50 | | |
| | Propylene glycol — 188° C. | | | | | | | | | | | 29.50 | | | |
| | Dipropylene glycol — 232° C. | | | | | | | | | | 29.50 | | | | |
| | Tripropylene glycol — 271° C. | | | | | | | | | 29.50 | | | | | |
| | 1,2-butanediol — 193° C. | | | | | | | | | | | | | 29.50 | |
| | 1,4-butanediol — 228° C. | | | | | | | | | | | | | | 29.50 |
| | 3-methyl-1,3-butanediol — 203° C. | | | | | | | | | | | | | | |
| | 2-methyl-1,3-propanediol — 213° C. | | | | | | | | | | | | | | |
| | Glycerin — 290° C. | | | | | | | | | | | | | | |
| Organic solvent Amines | Ethanolamine — 171° C. | | | | | | | | | | | | | | |
| | Diethanolamine — 269° C. | | | | | | | | | | | | | | |
| | Triethanolamine — 335° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| | N,N-dimethylethanolamine — 135° C. | | | | | | | | | | | | | | |
| | N,N-diethylethanolamine — 162° C. | | | | | | | | | | | | | | |
| | N,N-dibutylethanolamine — 229° C. | | | | | | | | | | | | | | |
| | N-methyldiethanolamine — 247° C. | | | | | | | | | | | | | | |
| | N-ethyldiethanolamine — 247° C. | | | | | | | | | | | | | | |
| | N-butyldiethanolamine — 265° C. | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 137.0 | 137.0 | 137.0 | 137.0 | 137.0 | 137.0 | 137.0 | 137.0 | 147.0 | 147.0 | 147.0 | 147.0 | 142.0 | 142.0 |
| Ratio of monool to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |

TABLE 6-continued

| | Examples | | | | | | | | | | | | | |
|---|---|---|---|---|---|---|---|---|---|---|---|---|---|
| | 71 | 72 | 73 | 74 | 75 | 76 | 77 | 78 | 79 | 80 | 81 | 82 | 83 | 84 |
| Gloss | 88 | 81 | 86 | 88 | 82 | 84 | 88 | 84 | 86 | 88 | 82 | 84 | 86 | 88 |
| Continuous discharge stability | A | A | A | A | A | A | A | A | A | A | A | A | A | A |
| Storage stability | A | A | A | A | A | A | A | A | A | A | A | A | A | A |
| Wetting properties | A | A | A | A | A | A | A | A | A | A | A | A | A | A |

TABLE 7

| | | Boiling point | Examples 85 | 86 | 87 | 88 | 89 | 90 | 91 | 92 | 93 | 94 | 95 | 96 | 97 | 98 |
|---|---|---|---|---|---|---|---|---|---|---|---|---|---|---|---|---|
| | Copper phthalocyanine | | | | | | | | | | | | | | | 1.50 |
| | Quinoxalinedione | | | | | | | | | | | | | 1.50 | 1.50 | |
| | Dimethyl quinacridene | | | | 3.00 | | | | | | | | 1.50 | | | |
| | Carbon black | | 3.00 | | | 3.00 | 3.00 | | 3.00 | 3.00 | 3.00 | | | | | |
| | Titanium dioxide | | | 15.00 | | | | 15.00 | | | | 15.00 | | | | |
| | Polyoxyethylene styrenated phenyl ether (HLB = 14) | | 1.00 | 1.00 | 1.00 | 1.00 | 1.00 | 1.00 | 1.00 | 1.00 | 1.00 | 1.00 | | | | |
| | Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| | Resin 2 | | | | | | | | | | | | 0.50 | 0.50 | 0.50 | 0.50 |
| | Resin 3 | | | | | | | | | | | | | | | |
| | Resin 4 | | | | | | | | | | | | | | | |
| | Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| | Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| | Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| | Ion-exchanged water | | 33.49 | 21.49 | 33.49 | 33.49 | 33.49 | 21.49 | 33.49 | 33.49 | 33.49 | 21.49 | 35.49 | 35.49 | 35.49 | 35.49 |
| Organic solvent having one hydroxyl group | Ethylene glycol monobutyl ether | 171° C. | 20.00 | 20.00 | 20.00 | 20.00 | 20.00 | 20.00 | 20.00 | 20.00 | 20.00 | 20.00 | 20.00 | 20.00 | 20.00 | 20.00 |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | | | | | | | | | | |
| | Diethylene glycol isobutyl ether | 220° C. | | | | | | | | | | | | | | |
| | Triethylene glycol monobutyl ether | 278° C. | | | | | | | | | | | | | | |
| Organic solvent having two or more hydroxyl groups | Ethylene glycol | 198° C. | | | | | | | | | | | | | | 29.50 |
| | Diethylene glycol | 245° C. | | | | | | | | | | | | | | |
| | Triethylene glycol | 285° C. | | | | | | | | | | | | | | |
| | Propylene glycol | 188° C. | | | | | | | | | | | | | | |
| | Dipropylene glycol | 232° C. | | | | | | | | | 29.50 | | | | | |
| | Tripropylene glycol | 271° C. | | | | | | | | 29.50 | | | | | | |
| | 1,2-butanediol | 193° C. | 29.50 | | | | | | 29.50 | | | | | | | |
| | 1,4-butanediol | 228° C. | | 29.50 | | | 29.50 | 29.50 | | | | | | | | |
| | 3-methyl-1,3-butanediol | 203° C. | | | 29.50 | 29.50 | | | | | | | | | | |
| | 2-methyl-1,3-propanediol | 213° C. | | | | | | | | | | | | | | |
| | Glycerin | 290° C. | | | | | | | | | | 29.50 | 29.50 | | | |
| Organic solvent Amines | Ethanolamine | 171° C. | 0.50 | 0.50 | 0.50 | 0.50 | 0.50 | 0.50 | 0.50 | 0.50 | | | | | | |
| | Diethanolamine | 269° C. | | | | | | | | | 0.5 | | | | | |
| | Triethanolamine | 335° C. | | | | | | | | | | 0.50 | | | | |
| | N,N-dimethylethanolamine | 135° C. | | | | | | | | | | | 0.50 | | | |
| | N,N-diethylethanolamine | 162° C. | | | | | | | | | | | | 0.50 | | |
| | N,N-dibutylethanolamine | 229° C. | | | | | | | | | | | | | | |
| | N-methyldiethanolamine | 247° C. | | | | | | | | | | | | | 0.50 | |
| | N-ethyldiethanolamine | 247° C. | | | | | | | | | | | | | | |
| | N-butyldiethanolamine | 265° C. | | | | | | | | | | | | | | 0.50 |
| | Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| | Difference in boiling point | | 142.0 | 142.0 | 107.0 | 107.0 | 107.0 | 107.0 | 132.0 | 132.0 | 132.0 | 132.0 | -27.0 | 71.0 | -63.0 | -36.9 |
| | Ratio of monool to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| | Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| | Total amount of organic solvents | | 50% | 50% | 50% | 50% | 50% | 50% | 50% | 50% | 50% | 50% | 50% | 50% | 50% | 50% |

TABLE 7-continued

| | Examples | | | | | | | | | | | | | |
|---|---|---|---|---|---|---|---|---|---|---|---|---|---|---|
| | 85 | 86 | 87 | 88 | 89 | 90 | 91 | 92 | 93 | 94 | 95 | 96 | 97 | 98 |
| Gloss | 82 | 84 | 86 | 88 | 82 | 84 | 88 | 84 | 86 | 88 | 72 | 85 | 68 | 73 |
| Continuous discharge stability | A | A | A | A | A | A | A | A | A | A | A | A | A | A |
| Storage stability | A | A | A | A | A | A | A | A | A | A | A | A | A | A |
| Wetting properties | A | A | A | A | A | A | A | A | A | A | A | A | A | A |

TABLE 8

| | | Examples | | | | | | | | | | | | | |
|---|---|---|---|---|---|---|---|---|---|---|---|---|---|---|---|
| | | 99 | 100 | 101 | 102 | 103 | 104 | 105 | 106 | 107 | 108 | 109 | 110 | 111 | 112 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| | Boiling point | | | | | | | | | | | | | | |
| Organic solvent having one hydroxyl group | Ethylene glycol monobutyl ether | 171° C. | | | | | | | | | | | | | |
| | Ethylene glycol isobutyl ether | 160° C. | | | | | | | | | | | | | |
| | Ethylene glycol tertiary butyl ether | 153° C. | | | | | | | | | | | | | |
| | Diethylene glycol monobutyl ether | 230° C. | 20.00 | 20.00 | 20.00 | 20.00 | | | | | | | | | | |
| | Diethylene glycol isobutyl ether | 220° C. | | | | | | | | | | | | | |
| | Triethylene glycol monobutyl ether | 278° C. | | | | | | | | | | | | | 20.00 |
| Organic solvent having two or more hydroxyl groups | Ethylene glycol | 198° C. | 29.50 | 29.50 | 29.50 | 29.50 | 29.50 | 29.50 | 29.50 | 29.50 | 29.50 | 29.50 | 29.50 | 29.50 | | |
| | Diethylene glycol | 245° C. | | | | | | | | | | | | | | |
| | Triethylene glycol | 285° C. | | | | | | | | | | | | | | |
| | Propylene glycol | 188° C. | | | | | | | | | | | | | | |
| | Dipropylene glycol | 232° C. | | | | | | | | | | | | | 29.50 | |
| | Tripropylene glycol | 271° C. | | | | | | | | | | | | | | |
| | 1,2-butanediol | 193° C. | | | | | | | | | | | | | | |
| | 1,4-butanediol | 228° C. | | | | | | | | | | | | | | |
| | 3-methyl-1,3-butanediol | 203° C. | | | | | | | | | | | | | | |
| | 2-methyl-1,3-propanediol | 213° C. | | | | | | | | | | | | | | |
| | Glycerin | 290° C. | | | 0.50 | | | | | | | | | | | |
| Organic solvent Amines | Ethanolamine | 171° C. | | | | | | | | | | | | | | |
| | Diethanolamine | 269° C. | | | | | | | | | | | | | | |
| | Triethanolamine | 335° C. | | | | | | | | | | | | | | |
| | N,N-dimethylethanolamine | 135° C. | | | | | | | | | | | | | | |
| | N,N-diethylethanolamine | 162° C. | | | | | | | | | | | | | | |
| | N,N-dibutylethanolamine | 229° C. | | | | | | | | | | | | | | |
| | N-methyldiethanolamine | 247° C. | | | | | | | | | | | | | | |
| | N-ethyldiethanolamine | 247° C. | | | | | | | | | | | | | | |
| | N-butyldiethanolamine | 265° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 31.0 | 49.0 | 49.0 | 67.0 | −27.0 | 71.0 | −63.0 | −36.0 | 31.0 | 49.0 | 49.0 | 67.0 | −17.0 | 81.0 |
| Ratio of monool to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |
| Gloss | | 82 | 85 | 86 | 84 | 82 | 82 | 83 | 84 | 85 | 84 | 86 | 87 | 80 | 80 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 9

| | | Examples | | | | | | | | | | | | |
|---|---|---|---|---|---|---|---|---|---|---|---|---|---|---|
| | | 113 | 114 | 115 | 116 | 117 | 118 | 119 | 120 | 121 | 122 | 123 | 124 | 125 | 126 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | Boiling point 171° C. | | | | | | | | | | | | | |
| | Ethylene glycol isobutyl ether | 160° C. | | | | | | | | | | | | | |
| | Ethylene glycol tertiary butyl ether | 153° C. | | | | | | | | | | | | | |
| | Diethylene glycol monobutyl ether | 230° C. | | | | | | | | | | | | | |
| | Diethylene glycol isobutyl ether | 220° C. 20.00 | 20.00 | 20.00 | 20.00 | 20.00 | 20.00 | 20.00 | 20.00 | 20.00 | 20.00 | 20.00 | 20.00 | 20.00 | 20.00 |
| | Triethylene glycol monobutyl ether | 278° C. | | | | | | | | | | | | | |
| Organic solvent having two or more hydroxyl groups | Ethylene glycol | 198° C. | | | | | | | | | | | | | |
| | Diethylene glycol | 245° C. | | | | | | | | | | | | | |
| | Triethylene glycol | 285° C. | | | | | | | | | | | | | |
| | Propylene glycol | 188° C. | 29.50 | 29.50 | | | | | | | | | | | |
| | Dipropylene glycol | 232° C. | | | 29.50 | 29.50 | | | | | | | | | |
| | Tripropylene glycol | 271° C. | | | | | 29.50 | | | | | | | | |
| | 1,2-butanediol | 193° C. | | | | | | 29.50 | 29.50 | 29.50 | 29.50 | 29.50 | 29.50 | 29.50 | 29.50 |
| | 1,4-butanediol | 228° C. | | | | | | | | | | | | | |
| | 3-methyl-1,3-butanediol | 203° C. | | | | | | | | | | | | | |
| | 2-methyl-1,3-propanediol | 213° C. | | | | | | | | | | | | | |
| | Glycerin | 290° C. | | | | | | | | | | | | | |
| Organic Amines | Ethanolamine | 171° C. 0.50 | | | | | | | | | | | | | |
| | Diethanolamine | 269° C. | | | | | | | | | | | | | |
| | Triethanolamine | 335° C. | | | | | | | | | | | | | |
| | N,N-dimethylethanolamine | 135° C. | 0.50 | | | | | | | | | | | | |
| | N,N-diethylethanolamine | 162° C. | | 0.50 | | | | | | | | | | | |
| | N,N-dibutylethanolamine | 229° C. | | | 0.50 | | | | | | | | | | |
| | N-methyldiethanolamine | 247° C. | | | | 0.50 | | | | | | | | | |
| | N-ethyldiethanolamine | 247° C. | | | | | 0.50 | | | | | | | | |
| | N-butyldiethanolamine | 265° C. | | | | | | 0.50 | 0.50 | 0.50 | 0.50 | 0.50 | 0.50 | 0.50 | 0.50 |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | −53.0 | −26.0 | 41.0 | 59.0 | 59.0 | 77.0 | −22.0 | 76.0 | −55.0 | −31.0 | 36.0 | 54.0 | 54.0 | 72.0 |
| Ratio of moncol to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | 50% | 50% | 50% | 50% | 50% | 50% | 50% | 50% | 50% | 50% | 50% | 50% | 50% | 50% |
| Gloss | | 81 | 82 | 80 | 81 | 83 | 84 | 82 | 82 | 83 | 84 | 86 | 86 | 88 | 87 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 10

| | | | Examples | | | | | | | | | | | | |
|---|---|---|---|---|---|---|---|---|---|---|---|---|---|---|---|
| | | | 127 | 128 | 129 | 130 | 131 | 132 | 133 | 134 | 135 | 136 | 137 | 138 | 139 | 140 |
| Copper phthalocyanine | | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Resin 1 | | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | | |
| Resin 3 | | | | | | | | | | | | | | | | |
| Resin 4 | | | | | | | | | | | | | | | | |
| Resin 5 | | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | Boiling point 171° C. | | | | | | | | | | | | | | |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | | | | | | | | | | |
| | Diethylene glycol isobutyl ether | 220° C. | | | | | | | | | | | | | | |
| | Triethylene glycol monobutyl ether | 278° C. | 20.00 | 20.00 | 20.00 | 20.00 | 20.00 | 20.00 | 20.00 | 20.00 | 30.00 | 30.00 | 30.00 | 30.00 | 30.00 | 30.00 |
| Organic solvent having two or more hydroxyl groups | Ethylene glycol | 198° C. | | | | | | | | | | | | | | |
| | Diethylene glycol | 245° C. | | | | | | | | | | | | | | |
| | Triethylene glycol | 285° C. | | | | | | | | | | | | | | |
| | Propylene glycol | 188° C. | | | | | | | | | | | | | | |
| | Dipropylene glycol | 232° C. | | | | | | | | | | | | | | |
| | Tripropylene glycol | 271° C. | | | | | | | | | | | | | | |
| | 1,2-butanediol | 193° C. | 29.50 | 29.50 | 29.50 | 29.50 | 29.50 | 29.50 | 29.50 | 29.50 | 19.50 | 19.50 | 19.50 | 19.50 | 19.50 | 19.50 |
| | 1,4-butanediol | 228° C. | | | | | | | | | | | | | | |
| | 3-methyl-1,3-butanediol | 203° C. | | | | | | | | | | | | | | |
| | 2-methyl-1,3-propanediol | 213° C. | | | | | | | | | | | | | | |
| | Glycerin | 290° C. | 0.50 | | | | | | | | | | | | | |
| Organic solvent Amines | Ethanolamine | 171° C. | | 0.50 | | | | | | | | | | | | |
| | Diethanolamine | 269° C. | | | 0.50 | | | | | | | | | | | |
| | Triethanolamine | 335° C. | | | | 0.50 | | | | | | | | | | |
| | N,N-dimethylethanolamine | 135° C. | | | | | 0.50 | | | | | | | | | |
| | N,N-diethylethanolamine | 162° C. | | | | | | 0.50 | | | | | | | | |
| | N,N-dibutylethanolamine | 229° C. | | | | | | | 0.50 | | | | | | | |
| | N-methyldiethanolamine | 247° C. | | | | | | | | 0.50 | | | | | | |
| | N-ethyldiethanolamine | 247° C. | | | | | | | | | 0.50 | | | | | |
| | N-butyldiethanolamine | 265° C. | | | | | | | | | | 0.50 | | | | |
| Total | | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | | −22.0 | 76.0 | −58.0 | −91.0 | 96.0 | 54.0 | 54.0 | 72.0 | −22.0 | 76.0 | −58.0 | −31.0 | 36.0 | 54.0 |
| Ratio of moncol to diol | | | 0.68 | 0.68 | 0.68 | 0.68 | 0.68 | 0.68 | 0.68 | 0.68 | 1.53 | 1.53 | 1.53 | 1.53 | 1.53 | 1.53 |
| Ratio of amine | | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | | 50% | 50% | 50% | 50% | 50% | 50% | 50% | 50% | 50% | 50% | 50% | 50% | 50% | 50% |
| Gloss | | | 82 | 81 | 84 | 82 | 82 | 83 | 82 | 83 | 83 | 82 | 85 | 84 | 83 | 85 |
| Continuous discharge stability | | | A | A | A | A | A | A | A | A | A | A | A | A | A | A |
| Storage stability | | | A | A | A | A | A | A | A | A | A | A | A | A | A | A |
| Wetting properties | | | A | A | A | A | A | A | A | A | A | A | A | A | A | A |

TABLE 11

| | | | Examples | | | | | | | | | | | | |
|---|---|---|---|---|---|---|---|---|---|---|---|---|---|---|---|
| | | | 141 | 142 | 143 | 144 | 145 | 146 | 147 | 148 | 149 | 150 | 151 | 152 | 153 | 154 |
| Copper phthalocyanine | | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Resin 1 | | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | | |
| Resin 3 | | | | | | | | | | | | | | | | |
| Resin 4 | | | | | | | | | | | | | | | | |
| Resin 5 | | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | | 35.49 | 35.49 | 35.49 | 35.49 | 35.49 | 35.49 | 35.49 | 35.49 | 35.49 | 35.49 | 35.49 | 45.49 | 55.49 | 65.49 |
| Organic solvent having one hydroxyl group | Ethylene glycol monobutyl ether | Boiling point 171° C. | | | | | | | | | | | | | | |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | | | | | | | | | | |
| | Diethylene glycol isobutyl ether | 220° C. | | | | | | | | | | | | | 10.00 |
| | Triethylene glycol monobutyl ether | 278° C. | 30.00 | 30.00 | 20.00 | 20.00 | 20.00 | 20.00 | 20.00 | 20.00 | 20.00 | 20.00 | 20.00 | 15.00 | 10.00 | |
| Organic solvent having two or more hydroxyl groups | Ethylene glycol | 198° C. | | | | | | | | | | | | | | |
| | Diethylene glycol | 245° C. | | | | | | | | | | | | | | |
| | Triethylene glycol | 285° C. | | | | | | | | | | | | | | |
| | Propylene glycol | 188° C. | | | | | | | | | | | | | | |
| | Dipropylene glycol | 232° C. | | | | | | | | | | | | | | |
| | Tripropylene glycol | 271° C. | | | | | | | | | | | | | | |
| | 1,2-butanediol | 193° C. | 19.50 | 19.50 | | | | | | | | | | | | |
| | 1,4-butanediol | 228° C. | | | 29.50 | 29.50 | 29.50 | 29.50 | 29.50 | 29.50 | 29.50 | 29.50 | 29.50 | 24.50 | 19.50 | 9.50 |
| | 3-methyl-1,3-butanediol | 203° C. | | | | | | | | | | | | | | |
| | 2-methyl-1,3-propanediol | 213° C. | | | | | | | | | | | | | | |
| | Glycerin | 290° C. | | | | | | | | | | | | | | |
| Organic solvent Amines | Ethanolamine | 171° C. | | | | | | | | | | | | | | |
| | Diethanolamine | 269° C. | | | | | | | | | | | | | | |
| | Triethanolamine | 335° C. | | | | | | | | | | | | | | |
| | N,N-dimethylethanolamine | 135° C. | | | 0.50 | | | | | | | | | | | |
| | N,N-diethylethanolamine | 162° C. | | | | 0.50 | | | | | | | | | | |
| | N,N-dibutylethanolamine | 229° C. | | | | | 0.50 | | | | | | | | | |
| | N-methyldiethanolamine | 247° C. | | | | | | 0.50 | | | | | | | | |
| | N-ethyldiethanolamine | 247° C. | 0.50 | | | | | | 0.50 | | | | | | | |
| | N-butyldiethanolamine | 265° C. | | 0.50 | | | | | | 0.50 | 0.50 | 0.50 | 0.05 | 0.05 | 0.05 | 0.05 |
| Total | | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | | 54.0 | 72.0 | −49.0 | 49.0 | −85.0 | −58.0 | 9.0 | 27.0 | 27.0 | 45.0 | 137.0 | 137.0 | 137.0 | 137.0 |
| Ratio of moncol to diol | | | 1.53 | 1.53 | 0.68 | 0.68 | 0.68 | 0.68 | 0.68 | 0.68 | 0.68 | 0.68 | 0.68 | 0.61 | 0.51 | 1.05 |
| Ratio of amine | | | 0.010 | 0.010 | 0.010 | 0.010 | 0.010 | 0.010 | 0.010 | 0.010 | 0.010 | 0.010 | 0.001 | 0.013 | 0.017 | 0.026 |
| Total amount of organic solvents | | | 50% | 50% | 50% | 50% | 50% | 50% | 50% | 50% | 50% | 50% | 50% | 40% | 30% | 20% |
| Gloss | | | 82 | 83 | 79 | 80 | 80 | 82 | 82 | 83 | 84 | 86 | 63 | 84 | 86 | 88 |
| Continuous discharge stability | | | A | A | A | A | A | A | A | A | A | A | A | A | B | B |
| Storage stability | | | A | A | A | A | A | A | A | A | A | A | A | A | A | A |
| Wetting properties | | | A | A | A | A | A | A | A | A | A | A | A | B | B | B |

TABLE 12

| | | | 155 | 156 | 157 | 158 | 159 | 160 | 161 | 162 | 163 | 164 | 165 | 166 | 167 | 168 |
|---|---|---|---|---|---|---|---|---|---|---|---|---|---|---|---|---|
| | Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| | Polyoxyethylene styrenated phenyl ether (HLB = 14) | | 0.01 | 0.01 | 0.01 | 0.01 | 0.01 | 0.01 | 0.01 | 0.01 | 0.01 | 0.01 | 0.01 | 0.01 | 0.01 | 0.50 |
| | Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| | Resin 2 | | | | | | | | | | | | | | | |
| | Resin 3 | | | | | | | | | | | | | | | |
| | Resin 4 | | | | | | | | | | | | | | | |
| | Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| | Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| | Antifoamer B | | | | | | | | | | | | | | | 0.50 |
| | Surface conditioner A | | 0.50 | 0.50 | 0.50 | 0.50 | 0.50 | 0.50 | 0.50 | 0.50 | 0.50 | 0.50 | | | | |
| | Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | Boiling point 171° C. | 20.00 | 20.00 | 20.00 | 20.00 | 20.00 | 20.00 | 20.00 | 20.00 | 20.00 | 20.00 | 20.00 | 20.00 | 20.00 | 20.00 |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | | | | | | | | | | |
| | Diethylene glycol isobutyl ether | 220° C. | | | | | | | | | | | | | | |
| | Triethylene glycol monobutyl ether | 278° C. | | | | | | | | | | | | | | |
| Organic solvent having two or more hydroxyl groups | Ethylene glycol | 198° C. | 29.50 | | | | | | | | | | | | | |
| | Diethylene glycol | 245° C. | | 29.50 | | | | | | | | | | | | |
| | Triethylene glycol | 285° C. | | | 29.50 | | | | | | | | | | | |
| | Propylene glycol | 188° C. | | | | 29.50 | | | | | | | | | | |
| | Dipropylene glycol | 232° C. | | | | | 29.50 | | | | | | | | | |
| | Tripropylene glycol | 271° C. | | | | | | 29.50 | | | | | | | | |
| | 1,2-butanediol | 193° C. | | | | | | | 29.50 | | | | | | | |
| | 1,4-butanediol | 228° C. | | | | | | | | 29.50 | | | | | | |
| | 3-methyl-1,3-butanediol | 203° C. | | | | | | | | | 29.50 | | | | | |
| | 2-methyl-1,3-propanediol | 213° C. | | | | | | | | | | 29.50 | | | | |
| | Glycerin | 290° C. | | | | | | | | | | | 29.50 | | | |
| Organic solvent Amines | Ethanolamine | 171° C. | | | | | | | | | | | | 29.50 | | |
| | Diethanolamine | 269° C. | | | | | | | | | | | | | 29.50 | |
| | Triethanolamine | 335° C. | | | | | | | | | | | | | | 29.50 |
| | N,N-dimethylethanolamine | 135° C. | | | | | | | | | | | | | | |
| | N,N-diethylethanolamine | 162° C. | | | | | | | | | | | | | | |
| | N,N-dibutylethanolamine | 229° C. | | | | | | | | | | | | | | |
| | N-methyldiethanolamine | 247° C. | | | | | | | | | | | | | | |
| | N-ethyldiethanolamine | 247° C. | | | | | | | | | | | | | | |
| | N-butyldiethanolamine | 265° C. | | | | | | | | | | | | | | |
| | Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| | Difference in boiling point | | 164.0 | 164.0 | 164.0 | 164.0 | 164.0 | 164.0 | 164.0 | 164.0 | 164.0 | 164.0 | 164.0 | 164.0 | 164.0 | 164.0 |
| | Ratio of moncol to diol | | 0.68 | 0.68 | 0.68 | 0.68 | 0.68 | 0.68 | 0.68 | 0.68 | 0.68 | 0.68 | 0.68 | 0.68 | 0.68 | 0.68 |
| | Ratio of amine | | 0.010 | 0.010 | 0.010 | 0.010 | 0.010 | 0.010 | 0.010 | 0.010 | 0.010 | 0.010 | 0.010 | 0.010 | 0.010 | 0.010 |
| | Total amount of organic solvents | | 50% | 50% | 50% | 50% | 50% | 50% | 50% | 50% | 50% | 50% | 50% | 50% | 50% | 50% |
| | Gloss | | 80 | 81 | 81 | 82 | 82 | 84 | 85 | 86 | 87 | 86 | 87 | 80 | 81 | 81 |
| | Continuous discharge stability | | A | A | A | A | A | A | A | A | A | A | A | B | B | B |
| | Storage stability | | A | A | A | A | A | A | A | A | A | A | A | A | A | A |
| | Wetting properties | | A | A | A | A | A | A | A | A | A | A | A | A | A | A |

TABLE 13

| | Boiling point | Examples 169 | 170 | 171 | 172 | 173 | 174 | 175 | 176 | 177 | 178 | 179 | 180 | 181 | 182 |
|---|---|---|---|---|---|---|---|---|---|---|---|---|---|---|---|
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Antifoamer B | | 0.50 | 0.50 | 0.50 | 0.50 | 0.50 | 0.50 | 0.50 | 0.50 | 0.50 | 0.50 | 0.50 | 0.50 | 0.50 | 0.50 |
| Surface conditioner A | | | | | | | | | | | | | | | |
| Surface conditioner B | | | | | | | | | | | | | | | |
| Ion-exchanged water | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group — Ethylene glycol monobutyl ether | 171°C | 20.00 | 20.00 | 20.00 | 20.00 | 20.00 | 20.00 | 20.00 | 20.00 | 20.00 | 20.00 | 20.00 | 20.00 | 20.00 | 20.00 |
| Ethylene glycol isobutyl ether | 160°C | | | | | | | | | | | | | | |
| Ethylene glycol tertiary butyl ether | 153°C | | | | | | | | | | | | | | |
| Diethylene glycol monobutyl ether | 230°C | | | | | | | | | | | | | | 29.50 |
| Diethylene glycol isobutyl ether | 220°C | | | | | | | | | | | | | 29.50 | |
| Triethylene glycol monobutyl ether | 278°C | | | | | | | | | | | | 29.50 | | |
| Organic solvent having two or more hydroxyl groups — Ethylene glycol | 198°C | | | | | | | | | 29.50 | | | | | |
| Diethylene glycol | 245°C | | | | | | | | | | 29.50 | | | | |
| Triethylene glycol | 285°C | | | | | | | | | | | 29.50 | | | |
| Propylene glycol | 188°C | 29.50 | | | | | | | | | | | | | |
| Dipropylene glycol | 232°C | | 29.50 | | | | | | | | | | | | |
| Tripropylene glycol | 271°C | | | 29.50 | | | | | | | | | | | |
| 1,2-butanediol | 193°C | | | | 29.50 | | | | | | | | | | |
| 1,4-butanediol | 228°C | | | | | 29.50 | | | | | | | | | |
| 3-methyl-1,3-butanediol | 203°C | | | | | | 29.50 | | | | | | | | |
| 2-methyl-1,3-propanediol | 213°C | | | | | | | 29.50 | | | | | | | |
| Glycerin | 290°C | | | | | | | | 29.50 | | | | | | |
| Organic solvent Amines — Ethanolamine | 171°C | | | | | | | | | | | | | | |
| Diethanolamine | 269°C | | | | | | | | | | | | | | |
| Triethanolamine | 335°C | 0.50 | 0.50 | 0.50 | 0.50 | 0.50 | 0.50 | 0.50 | 0.50 | 0.50 | 0.50 | 0.50 | 0.50 | 0.50 | 0.50 |
| N,N-dimethylethanolamine | 135°C | | | | | | | | | | | | | | |
| N,N-diethylethanolamine | 162°C | | | | | | | | | | | | | | |
| N,N-dibutylethanolamine | 229°C | | | | | | | | | | | | | | |
| N-methyldiethanolamine | 247°C | | | | | | | | | | | | | | |
| N-ethyldiethanolamine | 247°C | | | | | | | | | | | | | | |
| N-butyldiethanolamine | 265°C | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 164.0 | 164.0 | 164.0 | 164.0 | 164.0 | 164.0 | 164.0 | 164.0 | 164.0 | 164.0 | 164.0 | 164.0 | 164.0 | 164.0 |
| Ratio of monocol to diol | | 0.68 | 0.68 | 0.68 | 0.68 | 0.68 | 0.68 | 0.68 | 0.68 | 0.68 | 0.68 | 0.68 | 0.68 | 0.68 | 0.68 |

TABLE 13-continued

| | Examples | | | | | | | | | | | | | |
|---|---|---|---|---|---|---|---|---|---|---|---|---|---|---|
| | 169 | 170 | 171 | 172 | 173 | 174 | 175 | 176 | 177 | 178 | 179 | 180 | 181 | 182 |
| Ratio of amine | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | 50% | 50% | 50% | 50% | 50% | 50% | 50% | 50% | 50% | 50% | 50% | 50% | 50% | 50% |
| Gloss | 82 | 83 | 83 | 83 | 84 | 85 | 85 | 86 | 77 | 76 | 79 | 80 | 81 | 81 |
| Continuous discharge stability | B | B | B | B | B | B | B | B | A | A | A | A | A | A |
| Storage stability | A | A | A | A | A | A | A | A | A | A | A | A | A | A |
| Wetting properties | A | A | A | A | A | A | A | A | B | B | B | B | B | B |

TABLE 14

| | | Boiling point | Examples 183 | 184 | 185 | 186 | 187 | 188 | 189 | 190 | 191 | 192 | 193 | 194 | 195 | 196 |
|---|---|---|---|---|---|---|---|---|---|---|---|---|---|---|---|---|
| Copper phthalocyanine | | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | | |
| Resin 3 | | | | | | | | | | | | | | | | |
| Resin 4 | | | | | | | | | | | | | | | | |
| Resin 5 | | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | | | | | | | 0.50 | 0.50 | 0.50 | 0.50 | 0.50 | 0.50 | 0.50 | 0.50 | 0.50 |
| Surface conditioner B | | | 0.50 | 0.50 | 0.50 | 0.50 | 0.50 | | | | | | | | | |
| Ion-exchanged water | | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | 171° C. | 20.00 | | | | | | | | | | | | | |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | 20.00 | 20.00 | 20.00 | 20.00 | 20.00 | 20.00 | 20.00 | 20.00 | 20.00 | 20.00 |
| | Diethylene glycol isobutyl ether | 220° C. | | | | | | | | | | | | | | |
| | Triethylene glycol monobutyl ether | 278° C. | | | | | | | | | | | | | | |
| Organic solvent having two or more hydroxyl groups | Ethylene glycol | 198° C. | | | | | | 29.50 | | | | | | | | |
| | Diethylene glycol | 245° C. | | | | | | | 29.50 | | | | | | | |
| | Triethylene glycol | 285° C. | | | | | | | | 29.50 | | | | | | |
| | Propylene glycol | 188° C. | | | | | | | | | 29.50 | | | | | |
| | Dipropylene glycol | 232° C. | | | | | | | | | | 29.50 | | | | |
| | Tripropylene glycol | 271° C. | | | | | | | | | | | 29.50 | | | |
| | 1,2-butanediol | 193° C. | 29.50 | | | | | | | | | | | | | |
| | 1,4-butanediol | 228° C. | | 29.50 | | | | | | | | | | | | |
| | 3-methyl-1,3-butanediol | 203° C. | | | 29.50 | | | | | | | | | | | |
| | 2-methyl-1,3-propanediol | 213° C. | | | | 29.50 | | | | | | | | | | |
| | Glycerin | 290° C. | | | | | 29.50 | | | | | | | | | |
| Organic solvent Amines | Ethanolamine | 171° C. | | | | | | | | | | | | 29.50 | | |
| | Diethanolamine | 269° C. | | | | | | | | | | | | | 29.50 | |
| | Triethanolamine | 335° C. | | | | | | | | | | | | | | 29.50 |
| | N,N-dimethylethanolamine | 135° C. | | | | | | | | | | | | | | |
| | N,N-diethylethanolamine | 162° C. | | | | | | | | | | | | | | |
| | N,N-dibutylethanolamine | 229° C. | | | | | | | | | | | | | | |
| | N-methyldiethanolamine | 247° C. | | | | | | | | | | | | | | |
| | N-ethyldiethanolamine | 247° C. | | | | | | | | | | | | | | |
| | N-butyldiethanolamine | 265° C. | | | | | | | | | | | | | | |
| Total | | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | | 164.0 | 164.0 | 164.0 | 164.0 | 164.0 | 137.0 | 105.0 | 105.0 | 147.0 | 105.0 | 105.0 | 142.0 | 107.0 | 132.0 |
| Ratio of monool to diol | | | 0.68 | 0.68 | 0.68 | 0.68 | 0.68 | 0.68 | 0.68 | 0.68 | 0.68 | 0.68 | 0.68 | 0.68 | 0.68 | 0.68 |
| Ratio of amine | | | 0.010 | 0.010 | 0.010 | 0.010 | 0.010 | 0.010 | 0.010 | 0.010 | 0.010 | 0.010 | 0.010 | 0.010 | 0.010 | 0.010 |
| Total amount of organic solvents | | | 50% | 50% | 50% | 50% | 50% | 50% | 50% | 50% | 50% | 50% | 50% | 50% | 50% | 50% |
| Gloss | | | 82 | 83 | 83 | 82 | 84 | 87 | 86 | 81 | 86 | 87 | 89 | 85 | 85 | 85 |
| Continuous discharge stability | | | A | A | A | A | A | A | A | A | A | A | A | A | A | A |
| Storage stability | | | A | A | A | A | A | A | A | A | A | A | A | A | A | A |
| Wetting properties | | | B | B | B | B | B | A | A | A | A | A | A | A | A | A |

TABLE 15

| | | Boiling point | Examples 197 | 198 | 199 | 200 | 201 | 202 | 203 | 204 | 205 | 206 | 207 | 208 | 209 | 210 |
|---|---|---|---|---|---|---|---|---|---|---|---|---|---|---|---|---|
| Copper phthalocyanine | | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | | 0.50 | 0.50 | 0.50 | 0.50 | 0.50 | 0.50 | 0.50 | 0.50 | 0.50 | 0.50 | 0.50 | 0.50 | 0.50 | 0.50 |
| | Resin 1 | | 4.00 | | | | | | | | | | | | | |
| | Resin 2 | | | 4.00 | | | | | | | | | | | | |
| | Resin 3 | | 4.00 | 4.00 | 4.00 | 4.00 | 4.00 | 4.00 | 4.00 | 4.00 | 4.00 | 4.00 | 4.00 | | | 4.00 |
| | Resin 4 | | | | | | | | | | | | | | | |
| | Resin 5 | | | | | | | | | | | | | | | |
| Antifoamer A | | | 8.00 | 8.00 | 8.00 | 8.00 | 8.00 | 8.00 | 8.00 | 8.00 | 8.00 | 8.00 | 8.00 | 8.00 | 8.00 | 8.00 |
| Surface conditioner A | | | 0.01 | 0.01 | 0.01 | 0.01 | 0.01 | 0.01 | 0.01 | 0.01 | 0.01 | 0.01 | 0.01 | 0.01 | 0.01 | 0.01 |
| Ion-exchanged water | | | 0.50 | 0.50 | 0.50 | 0.50 | 0.50 | 0.50 | 0.50 | 0.50 | 0.50 | 0.50 | 0.50 | 0.50 | 0.50 | 0.50 |
| | | | 35.49 | 35.49 | 35.49 | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | 171° C. | 20.00 | 20.00 | 20.00 | 20.00 | 20.00 | 20.00 | 20.00 | 20.00 | 20.00 | 20.00 | 20.00 | 20.00 | 20.00 | 20.00 |
| | Ethylene glycol isobutyl ether | 160° C. | | | | | | | | | | | | | | |
| | Ethylene glycol tertiary butyl ether | 153° C. | | | | | | | | | | | | | | |
| | Diethylene glycol monobutyl ether | 230° C. | | | | | | | | | | | | | | |
| | Diethylene glycol isobutyl ether | 220° C. | | | | | | | | | | | | | | |
| | Triethylene glycol monobutyl ether | 278° C. | | | | | | | | | | | | | | |
| Organic solvent having two or more hydroxyl groups | Ethylene glycol | 198° C. | | | 29.50 | | | | | | | | | | | |
| | Diethylene glycol | 245° C. | | | | 29.50 | | | | | | | | | | |
| | Triethylene glycol | 285° C. | | | | | 29.50 | | | | | | | | | |
| | Propylene glycol | 188° C. | | | | | | 29.50 | | | | | | | | |
| | Dipropylene glycol | 232° C. | | | | | | | 29.50 | | | | | | | |
| | Tripropylene glycol | 271° C. | | | | | | | | 29.50 | | | | | | |
| | 1,2-butanediol | 193° C. | | | | | | | | | 29.50 | | | | | |
| | 1,4-butanediol | 228° C. | | | | | | | | | | 29.50 | | | | |
| | 3-methyl-1,3-butanediol | 203° C. | | | | | | | | | | | 29.50 | | | |
| | 2-methyl-1,3-propanediol | 213° C. | | | | | | | | | | | | 29.50 | | |
| | Glycerin | 290° C. | | | | | | | | | | | | | 29.50 | |
| Organic solvent | Ethanolamine | 171° C. | | | | | | | | | | | | | | 29.95 |
| | Diethanolamine | 269° C. | | | | | | | | | | | | | | |
| | Triethanolamine | 335° C. | | | | | | | | | | | | | | |
| Amines | N,N-dimethylethanolamine | 135° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| | N,N-diethylethanolamine | 162° C. | | | | | | | | | | | | | | |
| | N,N-dibutylethanolamine | 229° C. | | | | | | | | | | | | | | |
| | N-methyldiethanolamine | 247° C. | | | | | | | | | | | | | | |
| | N-ethyldiethanolamine | 247° C. | | | | | | | | | | | | | | |
| | N-butyldiethanolamine | 265° C. | | | | | | | | | | | | | | |
| Total | | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | | 122.0 | 105.0 | 137.0 | 105.0 | 105.0 | 147.0 | 105.0 | 105.0 | 142.0 | 107.0 | 132.0 | 122.0 | 105.0 | 137.0 |
| Ratio of monocol to diol | | | 0.68 | 0.68 | 0.68 | 0.68 | 0.68 | 0.68 | 0.68 | 0.68 | 0.68 | 0.68 | 0.68 | 0.68 | 0.68 | 0.67 |
| Ratio of amine | | | 0.010 | 0.010 | 0.010 | 0.010 | 0.010 | 0.010 | 0.010 | 0.010 | 0.010 | 0.010 | 0.010 | 0.010 | 0.010 | 0.001 |
| Total amount of organic solvents | | | 50% | 50% | 50% | 50% | 50% | 50% | 50% | 50% | 50% | 50% | 50% | 50% | 50% | 50% |
| Gloss | | | 82 | 87 | 87 | 89 | 85 | 87 | 89 | 85 | 86 | 85 | 82 | 87 | 85 | 87 |
| Continuous discharge stability | | | A | A | A | A | A | A | A | A | A | A | A | A | A | A |
| Storage stability | | | A | A | A | A | A | A | A | A | A | A | A | A | A | A |
| Wetting properties | | | A | A | A | A | A | A | A | A | A | A | A | A | A | A |

TABLE 16

| | | Examples | | | | | | | | | | | | |
|---|---|---|---|---|---|---|---|---|---|---|---|---|---|---|
| | | 211 | 212 | 213 | 214 | 215 | 216 | 217 | 218 | 219 | 220 | 221 | 222 | 223 | 224 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 | 0.50 | 0.50 | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 35.49 | 35.49 | 45.49 | 45.49 | 45.49 | 45.49 | 45.49 | 45.49 | 45.49 | 45.49 | 45.49 | 45.49 | 45.49 | 55.49 |
| Organic solvent having one hydroxyl group | | Boiling point | | | | | | | | | | | | | |
| Ethylene glycol monobutyl ether | 171° C. | | | | | | | | | | | | | | |
| Ethylene glycol isobutyl ether | 160° C. | | | | | | | | | | | | | | |
| Ethylene glycol tertiary butyl ether | 153° C. | | | | | | | | | | | | | | |
| Diethylene glycol monobutyl ether | 230° C. | 20.00 | 20.00 | 16.00 | 16.00 | 16.00 | 16.00 | 16.00 | 16.00 | 16.00 | 16.00 | 16.00 | 16.00 | 16.00 | 12.00 |
| Diethylene glycol isobutyl ether | 220° C. | | | | | | | | | | | | | | |
| Triethylene glycol monobutyl ether | 278° C. | | | | | | | | | | | | | | |
| Organic solvent having two or more hydroxyl groups | Ethylene glycol | 198° C. | 29.90 | 29.75 | | | | | | | | | | | | 17.50 |
| Diethylene glycol | 245° C. | | | 23.50 | | | | | | | | | | | |
| Triethylene glycol | 285° C. | | | | 23.50 | | | | | | | | | | |
| Propylene glycol | 188° C. | | | | | 23.50 | | | | | | | | | |
| Dipropylene glycol | 232° C. | | | | | | 23.50 | | | | | | | | |
| Tripropylene glycol | 271° C. | | | | | | | 23.50 | | | | | | | |
| 1,2-butanediol | 193° C. | | | | | | | | 23.50 | | | | | | |
| 1,4-butanediol | 228° C. | | | | | | | | | 23.50 | | | | | |
| 3-methyl-1,3-butanediol | 203° C. | | | | | | | | | | 23.50 | | | | |
| 2-methyl-1,3-propanediol | 213° C. | | | | | | | | | | | 23.50 | | | |
| Glycerin | 290° C. | | | | | | | | | | | | 23.50 | | |
| Organic solvent | Ethanolamine | 171° C. | | | | | | | | | | | | | 23.50 | |
| Diethanolamine | 269° C. | | | | | | | | | | | | | | |
| Triethanolamine | 335° C. | | | | | | | | | | | | | | |
| Amines | N,N-dimethylethanolamine | 135° C. | 0.10 | 0.25 | 0.50 | 0.50 | 0.50 | 0.50 | 0.50 | 0.50 | 0.50 | 0.50 | 0.50 | 0.50 | 0.50 | 0.50 |
| N,N-diethylethanolamine | 162° C. | | | | | | | | | | | | | | |
| N,N-dibutylethanolamine | 229° C. | | | | | | | | | | | | | | |
| N-methyldiethanolamine | 247° C. | | | | | | | | | | | | | | |
| N-ethyldiethanolamine | 247° C. | | | | | | | | | | | | | | |
| N-butyldiethanolamine | 265° C. | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 137.0 | 137.0 | 137.0 | 105.0 | 105.0 | 147.0 | 105.0 | 105.0 | 142.0 | 107.0 | 132.0 | 122.0 | 105.0 | 137.0 |
| Ratio of monocol to diol | | 0.67 | 0.67 | 0.68 | 0.68 | 0.68 | 0.68 | 0.68 | 0.68 | 0.68 | 0.68 | 0.68 | 0.68 | 0.68 | 0.69 |
| Ratio of amine | | 0.002 | 0.005 | 0.013 | 0.013 | 0.013 | 0.013 | 0.013 | 0.013 | 0.013 | 0.013 | 0.013 | 0.013 | 0.013 | 0.017 |
| Total amount of organic solvents | | 50% | 50% | 40% | 40% | 40% | 40% | 40% | 40% | 40% | 40% | 40% | 40% | 40% | 30% |
| Gloss | | 48 | 61 | 85 | 87 | 89 | 85 | 88 | 89 | 87 | 86 | 85 | 85 | 87 | 89 |
| Continuous discharge stability | | A | A | A | A | A | A | A | A | A | A | A | A | A | A |
| Storage stability | | A | A | A | A | A | A | A | A | A | A | A | A | A | A |
| Wetting properties | | A | A | A | A | A | A | A | A | A | A | A | A | A | A |

TABLE 17

| | | | Examples | | | | | | | | | | | | |
|---|---|---|---|---|---|---|---|---|---|---|---|---|---|---|---|
| | | 225 | 226 | 227 | 228 | 229 | 230 | 231 | 232 | 233 | 234 | 235 | 236 | 237 | 238 |
| Copper phthalocyanine | | 1.50 | 1.50 | 1.50 | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | 0.50 | 0.50 | 0.50 | 0.50 | 0.50 | 0.50 | 0.50 | 0.50 | 0.50 | 0.50 | | | | |
| Polyoxyethylene styrenated phenyl ether (HLB = 18) | | | | | | | | | | | | 0.50 | | | |
| Polyoxyethylene tridecyl ether (HLB = 13) | | | | | | | | | | | | | 0.50 | | |
| Polyoxyethylene lauryl ether (HLB = 14) | | | | | | | | | | | | | | 0.50 | |
| Polyoxyethylene isodecyl ether (HLB = 16) | | | | | | | | | | | | | | | 0.50 |
| Resin 1 | | 4.00 | 4.00 | 4.00 | 4.00 | 4.00 | 4.00 | 4.00 | 4.00 | 4.00 | 4.00 | 4.00 | 4.00 | 4.00 | 4.00 |
| Resin 2 | | | | | | | | | | | | | | | |
| Resin 3 | | | | | | | | | | | | | | | |
| Resin 4 | | | | | | | | | | | | | | | |
| Resin 5 | | 8.00 | 8.00 | 8.00 | 8.00 | 8.00 | 8.00 | 8.00 | 8.00 | 8.00 | 8.00 | 8.00 | 8.00 | 8.00 | 8.00 |
| Antifoamer A | | 0.01 | 0.01 | 0.01 | 0.01 | 0.01 | 0.01 | 0.01 | 0.01 | 0.01 | 0.01 | 0.01 | 0.01 | 0.01 | 0.01 |
| Surface conditioner A | | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion-exchanged water | | 55.49 | 55.49 | 55.49 | 55.49 | 55.49 | 55.49 | 55.49 | 55.49 | 55.49 | 55.49 | 35.49 | 35.49 | 35.49 | 35.49 |
| Organic solvent having one hydroxyl group | Ethylene glycol monobutyl ether | Boiling point 171° C. | | | | | | | | | | | | | |
| | Ethylene glycol isobutyl ether | 160° C. | | | | | | | | | | | | | |
| | Ethylene glycol tertiary butyl ether | 153° C. | | | | | | | | | | | | | |
| | Diethylene glycol monobutyl ether | 230° C. | 12.00 | 12.00 | 12.00 | 12.00 | 12.00 | 12.00 | 12.00 | 12.00 | 12.00 | 12.00 | 20.00 | 20.00 | 20.00 | 20.00 |
| | Diethylene glycol isobutyl ether | 220° C. | | | | | | | | | | | | | |
| | Triethylene glycol monobutyl ether | 278° C. | | | | | | | | | | | | | |
| Organic solvent having two or more hydroxyl groups | Ethylene glycol | 198° C. | 17.50 | | | | | | | | | | | | | |
| | Diethylene glycol | 245° C. | | 17.50 | | | | | | | | | | | | |
| | Triethylene glycol | 285° C. | | | 17.50 | | | | | | | | 29.50 | 29.50 | 29.50 | 29.50 |
| | Propylene glycol | 188° C. | | | | 17.50 | | | | | | | | | | |
| | Dipropylene glycol | 232° C. | | | | | 17.50 | | | | | | | | | |
| | Tripropylene glycol | 271° C. | | | | | | 17.50 | | | | | | | | |
| | 1,2-butanediol | 193° C. | | | | | | | 17.50 | | | | | | | |
| | 1,4-butanediol | 228° C. | | | | | | | | 17.50 | | | | | | |
| | 3-methyl-1,3-butanediol | 203° C. | | | | | | | | | 17.50 | | | | | |
| | 2-methyl-1,3-propanediol | 213° C. | | | | | | | | | | 17.50 | | | | |
| | Glycerin | 290° C. | | | | | | | | | | | | | | |
| Organic solvent Amines | Ethanolamine | 171° C. | | | | | | | | | | | | | | |
| | Diethanolamine | 269° C. | | | | | | | | | | | | | | |
| | Triethanolamine | 335° C. | 0.50 | 0.50 | 0.50 | 0.50 | 0.50 | 0.50 | 0.50 | 0.50 | 0.50 | 0.50 | 0.50 | 0.50 | 0.50 | 0.50 |
| | N,N-dimethylethanolamine | 135° C. | | | | | | | | | | | | | | |
| | N,N-diethylethanolamine | 162° C. | | | | | | | | | | | | | | |
| | N,N-dibutylethanolamine | 229° C. | | | | | | | | | | | | | | |
| | N-methyldiethanolamine | 247° C. | | | | | | | | | | | | | | |
| | N-ethyldiethanolamine | 247° C. | | | | | | | | | | | | | | |
| | N-butyldiethanolamine | 265° C. | | | | | | | | | | | | | | |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 |
| Difference in boiling point | | 105.0 | 105.0 | 147.0 | 105.0 | 105.0 | 142.0 | 107.0 | 132.0 | 122.0 | 105.0 | 137.0 | 137.0 | 137.0 | 137.0 |
| Ratio of monool to diol | | 0.69 | 0.69 | 0.69 | 0.69 | 0.69 | 0.69 | 0.69 | 0.69 | 0.69 | 0.69 | 0.68 | 0.68 | 0.68 | 0.68 |

TABLE 17-continued

| | Examples | | | | | | | | | | | | | |
|---|---|---|---|---|---|---|---|---|---|---|---|---|---|---|
| | 225 | 226 | 227 | 228 | 229 | 230 | 231 | 232 | 233 | 234 | 235 | 236 | 237 | 238 |
| Ratio of amine | 0.017 | 0.017 | 0.017 | 0.017 | 0.017 | 0.017 | 0.017 | 0.017 | 0.017 | 0.017 | 0.010 | 0.010 | 0.010 | 0.010 |
| Total amount of organic solvents | 30% | 30% | 30% | 30% | 30% | 30% | 30% | 30% | 30% | 30% | 50% | 50% | 50% | 50% |
| Gloss | 85 | 85 | 87 | 89 | 85 | 86 | 85 | 82 | 87 | 83 | 86 | 88 | 81 | 83 |
| Continuous discharge stability | B | A | B | B | A | A | A | B | B | A | A | A | A | A |
| Storage stability | A | A | A | A | A | A | B | A | B | A | A | A | A | A |
| Wetting properties | A | A | A | B | B | B | B | B | B | A | A | A | A | A |

TABLE 18

|  |  |  | \multicolumn{9}{c}{Examples} |
|---|---|---|---|---|---|---|---|---|---|---|---|
|  |  |  | 239 | 240 | 241 | 242 | 243 | 244 | 245 | 246 | 252 |
|  | Copper phthalocyanine |  | 1.50 | 1.50 | 1.50 | 1.50 | 1.50 | 1.50 | 1.50 | 1.50 | 1.50 |
|  | Polyoxyethylene styrenated phenyl ether (HLB = 14) |  | 0.50 | 0.50 | 0.50 | 0.50 | 0.50 | 0.50 | 0.50 | 0.50 | 0.50 |
|  | Resin 1 |  | 4.00 | 4.00 | 4.00 | 4.00 | 4.00 | 4.00 | 4.00 | 4.00 | 4.00 |
|  | Resin 2 |  |  |  |  |  |  |  |  |  |  |
|  | Resin 3 |  |  |  |  |  |  |  |  |  |  |
|  | Resin 4 |  |  |  |  |  |  |  |  |  |  |
|  | Resin 5 |  | 8.00 | 8.00 | 8.00 | 8.00 | 8.00 | 8.00 | 8.00 | 8.00 | 8.00 |
|  | Antifoamer A |  | 0.01 | 0.01 | 0.01 | 0.01 | 0.01 | 0.01 | 0.01 | 0.01 | 0.01 |
|  | Surface conditioner A |  | 0.50 | 0.50 | 0.50 | 0.50 | 0.50 | 0.50 | 0.50 | 0.50 | 0.50 |
|  | Ion-exchanged water |  | 42.49 | 42.97 | 29.49 | 42.49 | 42.97 | 29.49 | 35.97 | 29.99 | 29.49 |
| Organic solvent having one hydroxyl group | Ethylene glycol monobutyl ether | Boiling point 171° C. |  |  |  |  |  |  |  |  |  |
|  | Ethylene glycol isobutyl ether | 160° C. |  |  |  |  |  |  |  |  |  |
|  | Ethylene glycol tertiary butyl ether | 153° C. |  |  |  |  |  |  |  |  |  |
|  | Diethylene glycol monobutyl ether | 230° C. | 30.00 | 30.00 | 35.00 | 30.00 | 30.00 | 35.00 | 20.00 | 20.00 | 25.00 |
|  | Diethylene glycol isobutyl ether | 220° C. |  |  |  |  |  |  |  |  |  |
|  | Triethylene glycol monobutyl ether | 278° C. |  |  |  |  |  |  |  |  |  |
| Organic solvent having two or more hydroxyl groups | Ethylene glycol | 198° C. | 12.50 | 12.50 | 15.00 | 12.50 | 12.50 | 15.00 | 29.50 | 29.50 | 30.00 |
|  | Diethylene glycol | 245° C. |  |  |  |  |  |  |  |  |  |
|  | Triethylene glycol | 285° C. |  |  |  |  |  |  |  |  |  |
|  | Propylene glycol | 188° C. |  |  |  |  |  |  |  |  |  |
|  | Dipropylene glycol | 232° C. |  |  |  |  |  |  |  |  |  |
|  | Tripropylene glycol | 271° C. |  |  |  |  |  |  |  |  |  |
|  | 1,2-butanediol | 193° C. |  |  |  |  |  |  |  |  |  |
|  | 1,4-butanediol | 228° C. |  |  |  |  |  |  |  |  |  |
|  | 3-methyl-1,3-butanediol | 203° C. |  |  |  |  |  |  |  |  |  |
|  | 2-methyl-1,3-propanediol | 213° C. |  |  |  |  |  |  |  |  |  |
|  | Glycerin | 290° C. |  |  |  |  |  |  |  |  |  |
| Organic solvent Amines | Ethanolamine | 171° C. |  |  |  |  |  |  |  |  |  |
|  | Diethanolamine | 269° C. |  |  |  |  |  |  |  |  |  |
|  | Triethanolamine | 335° C. |  |  |  | 0.50 | 0.02 | 6.00 | 0.02 | 6.00 | 1.00 |
|  | N,N-dimethylethanolamine | 135° C. | 0.50 | 0.02 | 6.00 |  |  |  |  |  |  |
|  | N,N-diethylethanolamine | 162° C. |  |  |  |  |  |  |  |  |  |
|  | N,N-dibutylethanolamine | 229° C. |  |  |  |  |  |  |  |  |  |
|  | N-methyldiethanolamine | 247° C. |  |  |  |  |  |  |  |  |  |
|  | N-ethyldiethanolamine | 247° C. |  |  |  |  |  |  |  |  |  |
|  | N-butyldiethanolamine | 265° C. |  |  |  |  |  |  |  |  |  |
|  | Total |  | 100.00 | 100.00 | 100.00 | 100.00 | 100.00 | 100.00 | 100.00 | 100.00 | 100.00 |
|  | Difference in boiling point |  | −63.0 | −63.0 | −63.0 | 137.0 | 137.0 | 137.0 | 137.0 | 137.0 | 137.0 |
|  | Ratio of moncol to diol |  | 2.40 | 2.40 | 2.33 | 2.40 | 2.40 | 2.33 | 0.68 | 0.68 | 0.83 |
|  | Ratio of amine |  | 0.012 | 0.0005 | 0.120 | 0.012 | 0.0005 | 0.120 | 0.0004 | 0.121 | 0.018 |
|  | Total amount of organic solvents |  | 43% | 43% | 56% | 43% | 43% | 56% | 50% | 56% | 56% |
|  | Gloss |  | 62 | 64 | 89 | 86 | 81 | 90 | 35 | 88 | 88 |
|  | Continuous discharge stability |  | B | B | B | B | B | B | A | A | A |
|  | Storage stability |  | A | A | B | A | A | B | A | B | B |
|  | Wetting properties |  | A | A | A | A | A | A | A | A | A |

TABLE 19

|  |  |  | \multicolumn{11}{c}{Examples} |
|---|---|---|---|---|---|---|---|---|---|---|---|---|---|
|  |  |  | 253 | 254 | 255 | 256 | 257 | 258 | 259 | 260 | 261 | 262 | 263 |
|  | Copper phthalocyanine |  | 1.50 | 1.50 | 1.50 | 1.50 | 1.50 | 1.50 | 1.50 | 1.50 | 1.50 | 1.50 | 1.50 |
|  | Polyoxyethylene styrenated phenyl ether (HLB = 14) |  | 0.50 | 0.50 | 0.50 | 0.50 | 0.50 | 0.50 | 0.50 | 0.50 | 0.50 | 0.50 | 0.50 |
|  | Resin 1 |  | 4.00 | 4.00 | 4.00 | 4.00 | 4.00 | 4.00 | 4.00 | 4.00 | 4.00 | 4.00 | 4.00 |
|  | Resin 2 |  |  |  |  |  |  |  |  |  |  |  |  |
|  | Resin 3 |  |  |  |  |  |  |  |  |  |  |  |  |
|  | Resin 4 |  |  |  |  |  |  |  |  |  |  |  |  |
|  | Resin 5 |  | 8.00 | 8.00 | 8.00 | 8.00 | 8.00 | 8.00 | 8.00 | 8.00 | 8.00 | 8.00 | 8.00 |
|  | Surface conditioner A |  | 0.50 | 0.50 | 0.50 | 0.50 | 0.50 | 0.50 | 0.50 | 0.50 | 0.50 | 0.50 | 0.50 |
|  | Ion-exchanged water |  | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | Boiling point 171° C. | 20.00 | 20.00 | 20.00 | 20.00 | 20.00 | 20.00 | 20.00 | 20.00 | 20.00 | 20.00 | 20.00 |
|  | Ethylene glycol isobutyl ether | 160° C. |  |  |  |  |  |  |  |  |  |  |  |
|  | Ethylene glycol tertiary butyl ether | 153° C. |  |  |  |  |  |  |  |  |  |  |  |
|  | Diethylene glycol monobutyl ether | 230° C. |  |  |  |  |  |  |  |  |  |  |  |

TABLE 19-continued

| | | | Examples | | | | | | | | | | |
|---|---|---|---|---|---|---|---|---|---|---|---|---|---|
| | | | 253 | 254 | 255 | 256 | 257 | 258 | 259 | 260 | 261 | 262 | 263 |
| Organic solvent having two or more hydroxyl groups | Diethylene glycol isobutyl ether | 220° C. | | | | | | | | | | | |
| | Triethylene glycol monobutyl ether | 278° C. | | | | | | | | | | | |
| | Ethylene glycol | 198° C. | 29.50 | | | | | | | | | | |
| | Diethylene glycol | 245° C. | | 29.50 | | | | | | | | | |
| | Triethylene glycol | 285° C. | | | 29.50 | | | | | | | | |
| | Propylene glycol | 188° C. | | | | 29.50 | | | | | | | |
| | Dipropylene glycol | 232° C. | | | | | 29.50 | | | | | | |
| | Tripropylene glycol | 271° C. | | | | | | 29.50 | | | | | |
| | 1,2-butanediol | 193° C. | | | | | | | 29.50 | | | | |
| | 1,4-butanediol | 228° C. | | | | | | | | 29.50 | | | |
| | 3-methyl-1,3-butanediol | 203° C. | | | | | | | | | 29.50 | | |
| | 2-methyl-1,3-propanediol | 213° C. | | | | | | | | | | 29.50 | |
| | Glycerin | 290° C. | | | | | | | | | | | 29.50 |
| Organic solvent Amines | Ethanolamine | 171° C. | | | | | | | | | | | |
| | Diethanolamine | 269° C. | | | | | | | | | | | |
| | Triethanolamine | 335° C. | 0.50 | 0.50 | 0.50 | 0.50 | 0.50 | 0.50 | 0.50 | 0.50 | 0.50 | 0.50 | 0.50 |
| | N,N-dimethylethanolamine | 135° C. | | | | | | | | | | | |
| | N,N-diethylethanolamine | 162° C. | | | | | | | | | | | |
| | N,N-dibutylethanolamine | 229° C. | | | | | | | | | | | |
| | N-methyldiethanolamine | 247° C. | | | | | | | | | | | |
| | N-ethyldiethanolamine | 247° C. | | | | | | | | | | | |
| | N-butyldiethanolamine | 265° C. | | | | | | | | | | | |
| | Total | | 100.00 | 100.00 | 100.00 | 100.00 | 100.00 | 100.00 | 100.00 | 100.00 | 100.00 | 100.00 | 100.00 |
| | Difference in boiling point | | 164.0 | 164.0 | 164.0 | 164.0 | 164.0 | 164.0 | 164.0 | 164.0 | 164.0 | 164.0 | 164.0 |
| | Ratio of moncol to diol | | 0.68 | 0.68 | 0.68 | 0.68 | 0.68 | 0.68 | 0.68 | 0.68 | 0.68 | 0.68 | 0.68 |
| | Ratio of amine | | 0.010 | 0.010 | 0.010 | 0.010 | 0.010 | 0.010 | 0.010 | 0.010 | 0.010 | 0.010 | 0.010 |
| | Total amount of organic solvents | | 50% | 50% | 50% | 50% | 50% | 50% | 50% | 50% | 50% | 50% | 50% |
| | Gloss | | 83 | 82 | 86 | 88 | 86 | 84 | 85 | 80 | 85 | 88 | 84 |
| | Continuous discharge stability | | B | B | B | B | B | B | B | B | B | B | B |
| | Storage stability | | A | A | A | A | A | A | A | A | A | A | A |
| | Wetting properties | | A | A | A | A | A | A | A | A | A | A | A |

TABLE 20

| | | | Examples | | | | | | | | | | |
|---|---|---|---|---|---|---|---|---|---|---|---|---|---|
| | | | 264 | 265 | 266 | 267 | 268 | 269 | 270 | 271 | 272 | 273 | 274 |
| | Copper phthalocyanine | | 1.50 | 1.50 | 1.50 | 1.50 | 1.50 | 1.50 | 1.50 | 1.50 | 1.50 | 1.50 | 1.50 |
| | Polyoxyethylene styrenated phenyl ether (HLB = 14) | | 0.50 | 0.50 | 0.50 | 0.50 | 0.50 | 0.50 | 0.50 | 0.50 | 0.50 | 0.50 | 0.50 |
| | Resin 1 | | 4.00 | 4.00 | 4.00 | 4.00 | 4.00 | 4.00 | 4.00 | 4.00 | 4.00 | 4.00 | 4.00 |
| | Resin 2 | | | | | | | | | | | | |
| | Resin 3 | | | | | | | | | | | | |
| | Resin 4 | | | | | | | | | | | | |
| | Resin 5 | | 8.00 | 8.00 | 8.00 | 8.00 | 8.00 | 8.00 | 8.00 | 8.00 | 8.00 | 8.00 | 8.00 |
| | Antifoamer A | | 0.01 | 0.01 | 0.01 | 0.01 | 0.01 | 0.01 | 0.01 | 0.01 | 0.01 | 0.01 | 0.01 |
| | Ion-exchanged water | | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | Boiling point 171° C. | 20.00 | 20.00 | 20.00 | 20.00 | 20.00 | 20.00 | 20.00 | 20.00 | 20.00 | 20.00 | 20.00 |
| | Ethylene glycol isobutyl ether | 160° C. | | | | | | | | | | | |
| | Ethylene glycol tertiary butyl ether | 153° C. | | | | | | | | | | | |
| | Diethylene glycol monobutyl ether | 230° C. | | | | | | | | | | | |
| | Diethylene glycol isobutyl ether | 220° C. | | | | | | | | | | | |
| | Triethylene glycol monobutyl ether | 278° C. | | | | | | | | | | | |

TABLE 20-continued

| | | | Examples | | | | | | | | | | |
|---|---|---|---|---|---|---|---|---|---|---|---|---|---|
| | | | 264 | 265 | 266 | 267 | 268 | 269 | 270 | 271 | 272 | 273 | 274 |
| Organic solvent having two or more hydroxyl groups | Ethylene glycol | 198° C. | 29.50 | | | | | | | | | | |
| | Diethylene glycol | 245° C. | | 29.50 | | | | | | | | | |
| | Triethylene glycol | 285° C. | | | 29.50 | | | | | | | | |
| | Propylene glycol | 188° C. | | | | 29.50 | | | | | | | |
| | Dipropylene glycol | 232° C. | | | | | 29.50 | | | | | | |
| | Tripropylene glycol | 271° C. | | | | | | 29.50 | | | | | |
| | 1,2-butanediol | 193° C. | | | | | | | 29.50 | | | | |
| | 1,4-butanediol | 228° C. | | | | | | | | 29.50 | | | |
| | 3-methyl-1,3-butanediol | 203° C. | | | | | | | | | 29.50 | | |
| | 2-methyl-1,3-propanediol | 213° C. | | | | | | | | | | 29.50 | |
| | Glycerin | 290° C. | | | | | | | | | | | 29.50 |
| Organic solvent Amines | Ethanolamine | 171° C. | | | | | | | | | | | |
| | Diethanolamine | 269° C. | | | | | | | | | | | |
| | Triethanolamine | 335° C. | 0.50 | 0.50 | 0.50 | 0.50 | 0.50 | 0.50 | 0.50 | 0.50 | 0.50 | 0.50 | 0.50 |
| | N,N-dimethylethanolamine | 135° C. | | | | | | | | | | | |
| | N,N-diethylethanolamine | 162° C. | | | | | | | | | | | |
| | N,N-dibutylethanolamine | 229° C. | | | | | | | | | | | |
| | N-methyldiethanolamine | 247° C. | | | | | | | | | | | |
| | N-ethyldiethanolamine | 247° C. | | | | | | | | | | | |
| | N-butyldiethanolamine | 265° C. | | | | | | | | | | | |
| Total | | | 100.00 | 100.00 | 100.00 | 100.00 | 100.00 | 100.00 | 100.00 | 100.00 | 100.00 | 100.00 | 100.00 |
| Difference in boiling point | | | 164.0 | 164.0 | 164.0 | 164.0 | 164.0 | 164.0 | 164.0 | 164.0 | 164.0 | 164.0 | 164.0 |
| Ratio of moncol to diol | | | 0.68 | 0.68 | 0.68 | 0.68 | 0.68 | 0.68 | 0.68 | 0.68 | 0.68 | 0.68 | 0.68 |
| Ratio of amine | | | 0.010 | 0.010 | 0.010 | 0.010 | 0.010 | 0.010 | 0.010 | 0.010 | 0.010 | 0.010 | 0.010 |
| Total amount of organic solvents | | | 50% | 50% | 50% | 50% | 50% | 50% | 50% | 50% | 50% | 50% | 50% |
| Gloss | | | 82 | 81 | 86 | 88 | 88 | 83 | 85 | 81 | 85 | 86 | 84 |
| Continuous discharge stability | | | A | A | A | A | A | A | A | A | A | A | A |
| Storage stability | | | A | A | A | A | A | A | A | A | A | A | A |
| Wetting properties | | | B | B | B | B | B | B | B | B | B | B | B |

TABLE 21

| | | | Examples | | | | | | | | | | |
|---|---|---|---|---|---|---|---|---|---|---|---|---|---|
| | | | 275 | 276 | 277 | 278 | 279 | 280 | 281 | 282 | 283 | 284 | 285 |
| Copper phthalocyanine | | | 1.50 | 1.50 | 1.50 | 1.50 | 1.50 | 1.50 | 1.50 | 1.50 | 1.50 | 1.50 | 1.50 |
| Polyoxyethylene styrenated phenyl ether (HLB = 14) | | | 0.50 | 0.50 | 0.50 | 0.50 | 0.50 | 0.50 | 0.50 | 0.50 | 0.50 | 0.50 | 0.50 |
| Resin 1 | | | 4.00 | 4.00 | 4.00 | 4.00 | 4.00 | 4.00 | 4.00 | 4.00 | 4.00 | 4.00 | 4.00 |
| Resin 2 | | | | | | | | | | | | | |
| Resin 3 | | | | | | | | | | | | | |
| Resin 4 | | | | | | | | | | | | | |
| Resin 5 | | | 8.00 | 8.00 | 8.00 | 8.00 | 8.00 | 8.00 | 8.00 | 8.00 | 8.00 | 8.00 | 8.00 |
| Ion-exchanged water | | | 35.49 | 35.49 | 35.49 | 35.49 | 35.49 | 35.49 | 35.49 | 35.49 | 35.49 | 35.49 | 35.49 |
| Organic solvent having one hydroxyl group | Ethylene glycol monobutyl ether | Boiling point 171° C. | 20.00 | 20.00 | 20.00 | 20.00 | 20.00 | 20.00 | 20.00 | 20.00 | 20.00 | 20.00 | 20.00 |
| | Ethylene glycol isobutyl ether | 160° C. | | | | | | | | | | | |
| | Ethylene glycol tertiary butyl ether | 153° C. | | | | | | | | | | | |
| | Diethylene glycol monobutyl ether | 230° C. | | | | | | | | | | | |
| | Diethylene glycol isobutyl ether | 220° C. | | | | | | | | | | | |
| | Triethylene glycol monobutyl ether | 278° C. | | | | | | | | | | | |
| Organic solvent having two or more hydroxyl groups | Ethylene glycol | 198° C. | 29.50 | | | | | | | | | | |
| | Diethylene glycol | 245° C. | | 29.50 | | | | | | | | | |
| | Triethylene glycol | 285° C. | | | 29.50 | | | | | | | | |
| | Propylene glycol | 188° C. | | | | 29.50 | | | | | | | |
| | Dipropylene glycol | 232° C. | | | | | 29.50 | | | | | | |
| | Tripropylene glycol | 271° C. | | | | | | 29.50 | | | | | |
| | 1,2-butanediol | 193° C. | | | | | | | 29.50 | | | | |
| | 1,4-butanediol | 228° C. | | | | | | | | 29.50 | | | |

TABLE 21-continued

|  |  |  | Examples |  |  |  |  |  |  |  |  |  |  |
|---|---|---|---|---|---|---|---|---|---|---|---|---|---|
|  |  |  | 275 | 276 | 277 | 278 | 279 | 280 | 281 | 282 | 283 | 284 | 285 |
|  | 3-methyl-1,3-butanediol | 203° C. |  |  |  |  |  |  |  |  | 29.50 |  |  |
|  | 2-methyl-1,3-propanediol | 213° C. |  |  |  |  |  |  |  |  |  | 29.50 |  |
|  | Glycerin | 290° C. |  |  |  |  |  |  |  |  |  |  | 29.50 |
| Organic solvent Amines | Ethanolamine | 171° C. |  |  |  |  |  |  |  |  |  |  |  |
|  | Diethanolamine | 269° C. |  |  |  |  |  |  |  |  |  |  |  |
|  | Triethanolamine | 335° C. | 0.50 | 0.50 | 0.50 | 0.50 | 0.50 | 0.50 | 0.50 | 0.50 | 0.50 | 0.50 | 0.50 |
|  | N,N-dimethylethanolamine | 135° C. |  |  |  |  |  |  |  |  |  |  |  |
|  | N,N-diethylethanolamine | 162° C. |  |  |  |  |  |  |  |  |  |  |  |
|  | N,N-dibutylethanolamine | 229° C. |  |  |  |  |  |  |  |  |  |  |  |
|  | N-methyldiethanolamine | 247° C. |  |  |  |  |  |  |  |  |  |  |  |
|  | N-ethyldiethanolamine | 247° C. |  |  |  |  |  |  |  |  |  |  |  |
|  | N-butyldiethanolamine | 265° C. |  |  |  |  |  |  |  |  |  |  |  |
|  | Total |  | 100.00 | 100.00 | 100.00 | 100.00 | 100.00 | 100.00 | 100.00 | 100.00 | 100.00 | 100.00 | 100.00 |
|  | Difference in boiling point |  | 164.0 | 164.0 | 164.0 | 164.0 | 164.0 | 164.0 | 164.0 | 164.0 | 164.0 | 164.0 | 164.0 |
|  | Ratio of moncol to diol |  | 0.68 | 0.68 | 0.68 | 0.68 | 0.68 | 0.68 | 0.68 | 0.68 | 0.68 | 0.68 | 0.68 |
|  | Ratio of amine |  | 0.10 | 0.10 | 0.10 | 0.10 | 0.10 | 0.10 | 0.10 | 0.10 | 0.10 | 0.10 | 0.10 |
|  | Total amount of organic solvents |  | 50% | 50% | 50% | 50% | 50% | 50% | 50% | 50% | 50% | 50% | 50% |
|  | Gloss |  | 82 | 80 | 84 | 87 | 85 | 82 | 83 | 79 | 84 | 83 | 81 |
|  | Continuous discharge stability |  | B | B | B | B | B | B | B | B | B | B | B |
|  | Storage stability |  | A | A | A | A | A | A | A | A | A | A | A |
|  | Wetting properties |  | B | B | B | B | B | B | B | B | B | B | B |

TABLE 22

|  |  |  | Comparative Examples |  |  |  |  |
|---|---|---|---|---|---|---|---|
|  |  |  | 1 | 2 | 3 | 4 | 5 |
|  | Copper phthalocyanine |  | 1.50 | 1.50 | 1.50 | 1.50 | 1.50 |
|  | Polyoxyethylene styrenated phenyl ether (HLB = 14) |  | 0.50 | 0.50 | 0.50 | 0.50 |  |
|  | Resin 1 |  |  |  |  | 4.00 | 4.00 |
|  | Resin 2 |  |  |  |  |  |  |
|  | Resin 3 |  |  |  |  |  |  |
|  | Resin 4 |  | 4.00 | 4.00 | 4.00 |  |  |
|  | Resin 5 |  | 8.00 | 8.00 | 8.00 | 8.00 | 8.00 |
|  | Antifoamer A |  | 0.01 | 0.01 | 0.01 | 0.01 | 0.01 |
|  | Surface conditioner A |  | 0.50 | 1.50 | 2.50 | 1.50 |  |
|  | Ion-exchanged water |  | 29.49 | 28.49 | 65.48 | 78.49 | 28.99 |
| Organic solvent having one hydroxyl group | Ethylene glycol monobutyl ether | Boiling point 171° C. |  |  |  |  |  |
|  | Ethylene glycol isobutyl ether | 160° C. |  |  |  |  |  |
|  | Ethylene glycol tertiary butyl ether | 153° C. |  |  |  |  |  |
|  | Diethylene glycol monobutyl ether | 230° C. | 35.00 | 16.00 |  |  | 35.00 |
|  | Diethylene glycol isobutyl ether | 220° C. |  |  |  |  |  |
|  | Triethylene glycol monobutyl ether | 278° C. |  |  |  |  |  |
| Organic solvent having two or more hydroxyl groups | Ethylene glycol | 198° C. | 15.00 | 40.00 |  |  | 15.00 |
|  | Diethylene glycol | 245° C. |  |  |  |  |  |
|  | Triethylene glycol | 285° C. |  |  | 18.00 |  |  |
|  | Propylene glycol | 188° C. |  |  |  |  |  |
|  | Dipropylene glycol | 232° C. |  |  |  |  |  |
|  | Tripropylene glycol | 271° C. |  |  |  |  |  |
|  | 1,2-butanediol | 193° C. |  |  |  |  |  |
|  | 1,4-butanediol | 228° C. |  |  |  |  |  |
|  | 3-methyl-1,3-butanediol | 203° C. |  |  |  |  |  |
|  | 2-methyl-1,3-propanediol | 213° C. |  |  |  |  |  |
|  | Glycerin | 290° C. |  |  |  |  |  |

TABLE 22-continued

|  |  |  | Comparative Examples | | | | |
|---|---|---|---|---|---|---|---|
|  |  |  | 1 | 2 | 3 | 4 | 5 |
| Organic solvent Amines | Ethanolamine | 171° C. |  |  |  |  |  |
|  | Diethanolamine | 269° C. |  |  |  |  |  |
|  | Triethanolamine | 335° C. |  |  |  |  |  |
|  | N,N-dimethylethanolamine | 135° C. | 6.00 |  | 0.01 | 4.00 | 4.00 |
|  | N,N-diethylethanolamine | 162° C. |  |  |  |  |  |
|  | N,N-dibutylethanolamine | 229° C. |  |  |  |  |  |
|  | N-methyldiethanolamine | 247° C. |  |  |  |  |  |
|  | N-ethyldiethanolamine | 247° C. |  |  |  |  |  |
|  | N-butyldiethanolamine | 265° C. |  |  |  |  |  |
|  | Total |  | 100.00 | 100.00 | 100.00 | 100.00 | 100.00 |
|  | Difference in boiling point |  | −63.0 | — | −150 | — | −63.0 |
|  | Ratio of moncol to diol |  | 2.33 | 0.4 | 0 | — | 2.33 |
|  | Ratio of amine |  | 0.12 | 0 | 0.001 | — | 0.08 |
|  | Total amount of organic solvents |  | 56% | 56% | 18% | 4% | 54% |
|  | Gloss |  | 62 | 45 | 33 | 30 | 40 |
|  | Continuous discharge stability |  | C | C | C | C | B |
|  | Storage stability |  | C | A | A | C | B |
|  | Wetting properties to substrate |  | A | B | C | C | C |

The invention claimed is:

1. A water-based coating composition characterized by containing a colorant, water, a wetting agent, an amine compound, a hydroxyl group-containing organic solvent and a urethane resin having a polycarbonate group, wherein the hydroxyl group-containing organic solvent consists of (A) a solvent having one hydroxyl group in one molecule and (B) a solvent having two or more hydroxyl groups in one molecule, in which a ratio by mass of (A) the solvent having one hydroxyl group in one molecule to (B) the solvent having two or more hydroxyl groups in one molecule is A:B=100:50 to 100:170, (A) the solvent having one hydroxyl group in one molecule is at least one selected from the group consisting of ethylene glycol monobutyl ether, ethylene glycol isobutyl ether, ethylene glycol tertiary butyl ether, diethylene glycol monobutyl ether, diethylene glycol isobutyl ether, and triethylene glycol monobutyl ether, (B) the solvent having two or more hydroxyl groups in one molecule is at least one selected from the group consisting of ethylene glycol, diethylene glycol, triethylene glycol, 1,2-propanediol, 2-methyl-1,3-propanediol, 1,2-butanediol, 1,4-butanediol, 3-methyl-1,3-butanediol, glycerin, dipropylene glycol and tripropylene glycol, and the amine compound is at least one selected from the group consisting of ethanolamine, diethanolamine, triethanolamine, N,N-dimethylethanolamine, N,N-diethylethanolamine, N,N-dibutylethanolamine, N-methyldiethanolamine, N-ethyldiethanolamine, and N-butyldiethanolamine.

2. A water-based coating composition according to claim 1, wherein the amine compound has a boiling point in a range from a temperature lower by 60° C. than the boiling point of a solvent having the lowest boiling point in the hydroxyl group-containing organic solvent to a temperature higher by 170° C. than the boiling point of the solvent having the lowest boiling point in the hydroxyl group-containing organic solvent.

3. A water-based coating composition according to claim 2, wherein the amine compound has a boiling point in a range from a temperature lower by 20° C. than the boiling point of a solvent having the lowest boiling point in the hydroxyl group-containing organic solvent to a temperature higher by 170° C. than the boiling point of the solvent having the lowest boiling point in the hydroxyl group-containing organic solvent.

4. A water-based coating composition according to claim 1, wherein a ratio by mass of (A) a solvent having one hydroxyl group in one molecule to (B) a solvent having two or more hydroxyl groups in one molecule in the hydroxyl group-containing organic solvent is A:B=100:50 to 100:150.

5. A water-based coating composition according to claim 1, wherein a ratio by mass of the amine compound to the hydroxyl group-containing organic solvent is 0.0005-0.1.

6. A water-based coating composition according to claim 1, wherein the urethane resin having a polycarbonate group is a urethane dispersion or urethane emulsion having an average particle diameter of 30 nm to 300 nm.

7. A water-based coating composition according to claim 1, which further comprises an acrylic dispersion or acrylic emulsion having a glass transition temperature Tg of not less than 60° C. and an average particle diameter of 50 nm to 200 nm.

8. A water-based coating composition according to claim 1, wherein a total amount of an organic solvent in the water-based coating composition is 20% by mass to 55% by mass.

9. A water-based coating composition according to claim 2, wherein a ratio by mass of the amine compound to the hydroxyl group-containing organic solvent is 0.0005-0.1.

10. A water-based coating composition according to claim 3, wherein a ratio by mass of the amine compound to the hydroxyl group-containing organic solvent is 0.0005-0.1.

11. A water-based coating composition according to claim 4, wherein a ratio by mass of the amine compound to the hydroxyl group-containing organic solvent is 0.0005-0.1.

12. A water-based coating composition according to claim 2, wherein the urethane resin having a polycarbonate group is a urethane dispersion or urethane emulsion having an average particle diameter of 30 nm to 300 nm.

13. A water-based coating composition according to claim 3, wherein the urethane resin having a polycarbonate group is a urethane dispersion or urethane emulsion having an average particle diameter of 30 nm to 300 nm.

14. A water-based coating composition according to claim 4, wherein the urethane resin having a polycarbonate group is a urethane dispersion or urethane emulsion having an average particle diameter of 30 nm to 300 nm.

15. A water-based coating composition according to claim 5, wherein the urethane resin having a polycarbonate group is a urethane dispersion or urethane emulsion having an average particle diameter of 30 nm to 300 nm.

* * * * *